US012652596B2

(12) United States Patent
Wang

(10) Patent No.: US 12,652,596 B2
(45) Date of Patent: Jun. 9, 2026

(54) FAILURE MONITORING AND RECOVERY MECHANISM IN CASE OF SL RELAY

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 370 days.

(21) Appl. No.: 18/268,718

(22) PCT Filed: Dec. 21, 2021

(86) PCT No.: PCT/EP2021/087018
§ 371 (c)(1),
(2) Date: Jun. 21, 2023

(87) PCT Pub. No.: WO2022/136387
PCT Pub. Date: Jun. 30, 2022

(65) Prior Publication Data
US 2023/0397081 A1     Dec. 7, 2023

(51) Int. Cl.
*H04W 36/30* (2009.01)
*H04W 76/19* (2018.01)

(52) U.S. Cl.
CPC ......... *H04W 36/305* (2018.08); *H04W 76/19* (2018.02)

(58) Field of Classification Search
CPC ... H04W 36/305; H04W 76/19; H04W 76/26; H04W 36/38; H04W 88/04; H04W 36/0079; H04W 36/0033; H04W 84/04; H04L 67/14
See application file for complete search history.

(56) References Cited

U.S. PATENT DOCUMENTS

2019/0254042 A1*   8/2019   Cirik ...................... H04L 5/0048
2020/0053613 A1*   2/2020   Cirik ........................ H04L 5/14
2021/0204344 A1*   7/2021   Babaei .................. H04W 80/02

FOREIGN PATENT DOCUMENTS

EP          3 471 493 A1      4/2019
EP          3471493 B1 *      9/2020   ............ H04W 76/25

OTHER PUBLICATIONS

"Service continuity for Remote UE" Nov. 2-13, 2020 (Year: 2020).*
OPPO, TR 38.836 v0.2.0 [online], 3GPP TSG RAN WG2 #112-e R2-200xxxx, Nov. 20, 2020 (25 pages).
International Search Report and the Written Opinion of the International Searching Authority, issued in corresponding International Application No. PCT/EP2021/087018, dated Jun. 17, 2022, 23 pages.

(Continued)

*Primary Examiner* — Mewale A Ambaye
(74) *Attorney, Agent, or Firm* — Rothwell, Figg, Ernst & Manbeck, P.C.

(57) ABSTRACT

Systems and methods are disclosed herein for failure monitoring and failure recovery. In one embodiment, a method performed by a remote wireless communication device in a communications system comprises performing a failure recovery procedure. The failure recovery procedure comprises selecting either a prepared cell or a prepared relay wireless communication device as a target cell or a target relay wireless communication device for the failure recovery.

20 Claims, 22 Drawing Sheets

(56) References Cited

OTHER PUBLICATIONS

LG Electronics Inc. "Service Continuity for Remote UE" 3GPP TSG-RAN WG2 Meeting #112e, R2-200659, Nov. 13, 2020, 4 pages.

ZTE Corporation et al. "Discussion on remaining issues on L2 Relay" 3GPP TSG RAN WG2 Meeting #112 electronic, R2-2009030, Nov. 2-13, 2020, 6 pages.

3GPP TR 36.746 V15.1.1 (Apr. 2018) 3rd Generation Partnership Project; Technical Specification Group Radio Access Network; Study on further enhancements to LTE Device to Device (D2D), User Equipment (UE) to network relays for Internet of Things (IoT) and wearables; (Release 15), 55 pages.

MediaTek Inc. "Service Continuity for L2 Relay and L3 Relay" 3GPP TSG-RAN WG2 Meeting #112 electronic, Nov. 2-13, 2020, R2-2009125, 12 pages.

3GPP TS 23.287 V16.3.0 (Jul. 2020) 3rd Generation Partnership Project; Technical Specification Group Services and System Aspects; Architecture enhancements for 5G System (5GS) to support Vehicle-to-Everything (V2X) services (Release 16), 57 pages.

3GPP TS 23.502 V16.5.0 (Jul. 2020) 3rd Generation Partnership Project; Technical Specification Group Services and System Aspects; Procedures for the 5G System (5GS); Stage 2 (Release 16), 594 pages.

3GPP TR 23.752 V0.3.0 (Jan. 2020) 3rd Generation Partnership Project; Technical Specification Group Services and System Aspects; Study on system enhancement for Proximity based Services (ProSe) in the 5G System (5GS) (Release 17), 73 pages.

3GPP TR 38.836 V1.0.0 (Dec. 2020) 3rd Generation Partnership Project; Technical Specification Group Radio Access Network; Study on NR sidelink relay; (Release 17), 21 pages.

3GPP TR 38.836 V0.01.0 (Sep. 2020) 3rd Generation Partnership Project; Technical Specification Group Radio Access Network; Study on NR sidelink relay; (Release 17), 19 pages.

LG Electronics Inc. "Service Continuity for Remote UE" 3GPP TSG-RAN WG2 Meeting #112e, Online Meeting, Nov. 2-13, 2020, R2-2010659, 4 pages.

* cited by examiner

*(Figure A.2.1-1: User Plane Stack for L2 UE-to-Network Relay UE in TR 23.752)*

(Prior Art)

*(Figure A.2.2-1: Control Plane for L2 UE-to-Network Relay UE in TR 23.752)*

(Prior Art)

*(Figure 6.7.3-1: Connection Establishment for Indirect Communication via UE-to-Network Relay UE in TR 23.752)*

(Prior Art)

*(Figure 4.5.4-2: Figure 4.5.4-1: Procedure for remote UE switching to direct Uu cell of TR 38.836)*

(Prior Art)

(Figure 4.5.4-2: Procedure for remote UE switching to indirect relay UE of TR 38.836 )

(Prior Art)

DIRECT PATH TO INDIRECT PATH SWITCH

900

902

TARGET CELL
904-T

SERVING CELL
904-S

906-RE-T

906-RM

INDIRECT LINK (TARGET CELL)

DIRECT LINK (SERVING CELL)

SIDELINK TO TARGET RELAY WCD FOR INDIRECT LINK TO TARGET CELL

LINK FROM TARGET RELAY WCD TO BS FOR INDIRECT LINK TO TARGET CELL

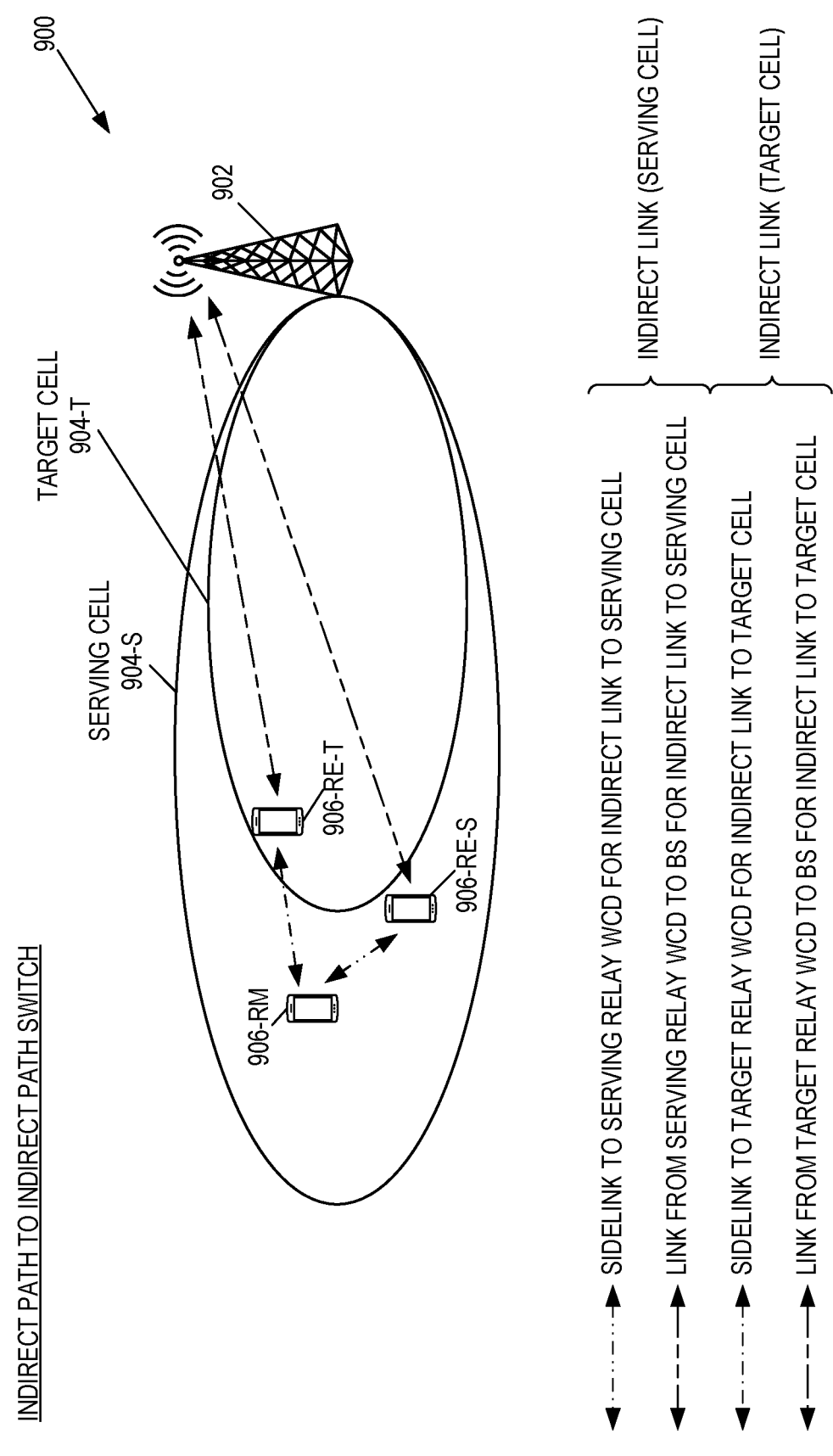

INDIRECT PATH TO INDIRECT PATH SWITCH

900

902

TARGET CELL
904-T

SERVING CELL
904-S

906-RE-T

906-RE-S

906-RM

INDIRECT LINK (SERVING CELL)

INDIRECT LINK (TARGET CELL)

SIDELINK TO SERVING RELAY WCD FOR INDIRECT LINK TO SERVING CELL

LINK FROM SERVING RELAY WCD TO BS FOR INDIRECT LINK TO SERVING CELL

SIDELINK TO TARGET RELAY WCD FOR INDIRECT LINK TO TARGET CELL

LINK FROM TARGET RELAY WCD TO BS FOR INDIRECT LINK TO TARGET CELL

FIG. 9B

Serving Node

Relay UE

1. RRCReconfiguration

2. Path switch failure

Remote UE

3. Initiates a failure recovery procedure (e.g., RRC re-establishment)

4. Provides a report message after the failure has been recovered.

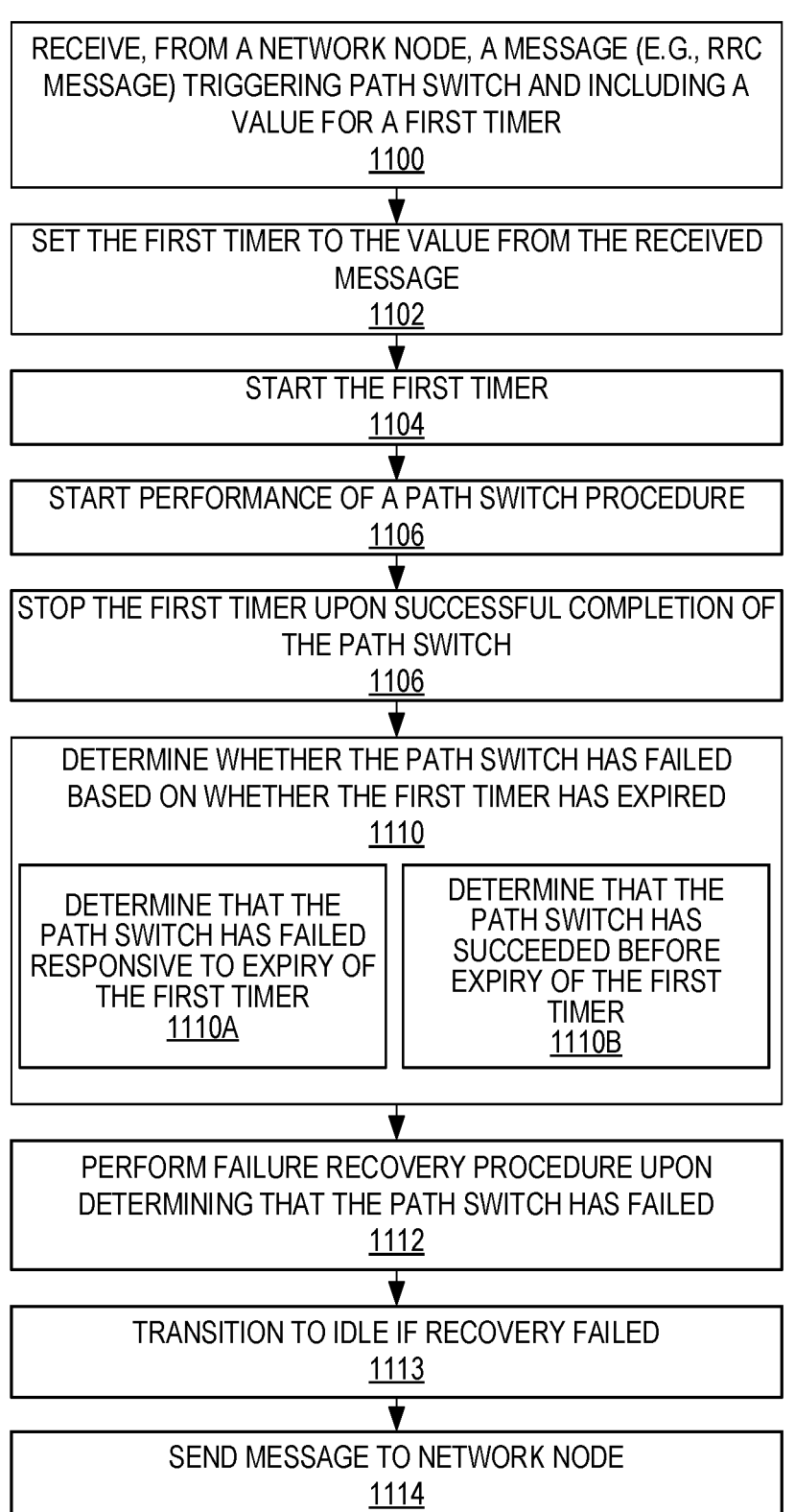

RECEIVE, FROM A NETWORK NODE, A MESSAGE (E.G., RRC MESSAGE) TRIGGERING PATH SWITCH AND INCLUDING A VALUE FOR A FIRST TIMER
1100

SET THE FIRST TIMER TO THE VALUE FROM THE RECEIVED MESSAGE
1102

START THE FIRST TIMER
1104

START PERFORMANCE OF A PATH SWITCH PROCEDURE
1106

STOP THE FIRST TIMER UPON SUCCESSFUL COMPLETION OF THE PATH SWITCH
1106

DETERMINE WHETHER THE PATH SWITCH HAS FAILED BASED ON WHETHER THE FIRST TIMER HAS EXPIRED
1110

DETERMINE THAT THE PATH SWITCH HAS FAILED RESPONSIVE TO EXPIRY OF THE FIRST TIMER
1110A

DETERMINE THAT THE PATH SWITCH HAS SUCCEEDED BEFORE EXPIRY OF THE FIRST TIMER
1110B

PERFORM FAILURE RECOVERY PROCEDURE UPON DETERMINING THAT THE PATH SWITCH HAS FAILED
1112

TRANSITION TO IDLE IF RECOVERY FAILED
1113

SEND MESSAGE TO NETWORK NODE
1114

START A SECOND TIMER
1200

PERFORM A SELECTION PROCEDURE
1202

PERFORM MEASUREMENTS
1202-1

SELECT THE TARGET ENTITY BASED ON THE
MEASUREMENTS
1202-2

ATTEMPT TO CONNECT TO THE SELECTED TARGET ENTITY
1204

STOP THE SECOND TIMER UPON SUCCESSFUL
CONNECTION
1206

DETERMINE THAT RECOVERY HAS FAILED, TRANSITION TO
IDLE MODE, AND START SEARCH PROCEDURE, RESPONSIVE
TO EXPIRY OF THE SECOND TIMER
1208

STORE AND/OR SEND PAIR INFORMATION
1300

STORE AND/OR SEND UE CONTEXT INFO
1302

SEND, TO A REMOTE WCD, A MESSAGE (E.G., RRC MESSAGE) TRIGGERING PATH SWITCH AND INCLUDING A VALUE FOR A FIRST TIMER
1304

RECEIVE MESSAGE TO NETWORK NODE
1306

FAILURE MONITORING AND RECOVERY MECHANISM IN CASE OF SL RELAY

CROSS REFERENCE TO RELATED APPLICATION(S)

This application is a 35 U.S.C. § 371 National Phase Entry Application from PCT/EP2021/087018, filed Dec. 21, 2021, designating the United States, which claims the benefit of International Application No. PCT/EP2020/087439, filed Dec. 21, 2020, the disclosures of which are incorporated herein by reference in their entirety.

TECHNICAL FIELD

The present disclosure relates to a wireless communications system, such as a cellular communications system, and more specifically relates to failure monitoring and recovery in a wireless communication system in which wireless communication devices can be used as relays.

BACKGROUND

1 NR Frame Structure

Similar to Long Term Evolution (LTE), New Radio (NR) uses Orthogonal Frequency Division Multiplexing (OFDM) in the downlink (i.e. from a network node, gNB, eNB, or base station, to a user equipment or UE). The basic NR physical resource over an antenna port can thus be seen as a time-frequency grid as illustrated in FIG. 1, where a resource block (RB) in a 14-symbol slot is shown. A resource block corresponds to twelve (12) contiguous sub-carriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^\mu)$ kHz where $\mu\in(0, 1, 2, 3, 4)$. $\Delta f=15$ kHz is the basic (or reference) subcarrier spacing that is also used in LTE.

In the time domain, downlink and uplink transmissions in NR will be organized into equally-sized subframes of 1 ms each similar to LTE. A subframe is further divided into multiple slots of equal duration. The slot length for subcarrier spacing $\Delta f=(15\times2^\mu)$ kHz is $\frac{1}{2}^\mu$ ms. There is only one slot per subframe for $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including Synchronization Signal Block (SSB), Channel State Information Reference Signal (CSI-RS), etc.

Uplink data transmissions, carried on Physical Uplink Shared Channel (PUSCH), can also be dynamically scheduled by the gNB by transmitting a DCI. The DCI (which is transmitted in the downlink (DL) region) always indicates a scheduling time offset so that the PUSCH is transmitted in a slot in the uplink (UL) region.

2 Radio Link Monitoring in LTE and NR

One of the main intentions of the Radio Link Failure (RLF) procedure in LTE was to assist the UE to perform a fast and reliable recovery without going via RRC_IDLE. It is beneficial to avoid unnecessary latency due to the RACH access and RRC connection establishment from RRC IDLE. The radio link monitoring of the serving cell followed by Radio Resource Control (RRC) re-establishment to the target cell in LTE is illustrated in FIG. 2.

In LTE, there are several reasons that may lead to the radio link failure, including:

1) Timer T310 expiry
2) Maximum number of RLC retransmissions in uplink is reached
3) Handover failure and timer T304 expiry Regarding radio link failure due to timer T310 expiry, while the UE is in RRC connected mode, the UE monitors the downlink radio channel quality based on the downlink reference symbol. The UE compares the measured downlink channel quality with the out-of-sync and in-sync thresholds, Qout and Qin respectively. The physical layer at the UE evaluates the downlink channel quality and periodically sends an indication of out-of-sync or in-sync to layer 3. The layer 3 at the UE then evaluates whether radio link failure has occurred based on the in-sync and out-of-sync indications that are output from layer 3. When the number of consecutively received out-of-sync indications is beyond the counter N310, a timer T310 is started. While T310 is running, the radio link will be considered to be recovered if the UE consecutively receives N311 in-sync indications from the physical layer. However, if the timer T310 expires before the radio link has recovered, a radio link failure is declared by the UE.

Regarding radio link failure due to timer T304 expiry, during a handover procedure, the timer T304 is started when the UE receives a handover command from the source cell. The value of the timer T304 should be set to allow the UE to try the maximum number of random access channel (RACH) access attempts (e.g., the maximum number of random access preamble transmissions) to the target cell. When the timer T304 has expired, a radio link failure due to handover is detected.

When a radio link failure is triggered, the radio connection re-establishment is triggered. A UE first performs a cell search to determine the best cell for radio link re-establishment. According to 3GPP TS 36.300 v15.7.0, a UE can select the same cell, a different cell from the same eNB, or a prepared cell from a different eNB as a target cell in which activity can be resumed (i.e., the UE stays in connected mode) via the radio connection re-establishment procedure since the previous UE context can be retrieved by inter-cell communication. However, when a prepared cell is not available, the UE selects an unprepared cell. In this case, the UE has to go to idle mode and try to setup the radio connection afterwards. In this case, activity of the UE cannot be resumed. Table 1 below is a reproduction of Table 10.1.6-1 from 3GPP TS 36.300, which guides the UE behavior for target cell selection.

TABLE 1

Table 10.1.6-1 in the 3GPP TS 36.300 V 15.7.0

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |

(NOTE):
a prepared eNB is an eNB which has admitted the UE during an earlier executed HO preparation phase, or obtains the UE context during the Second Phase.

3 Sidelink Transmissions in NR

Sidelink transmissions over NR are specified for Release 16. These are enhancements of the PROximity-based SErvices (ProSe) specified for LTE. Four new enhancements are particularly introduced to NR sidelink transmissions as follows:

Support for unicast and groupcast transmissions are added in NR sidelink. For unicast and groupcast, the physical sidelink feedback channel (PSFCH) is introduced for a receiver UE to reply the decoding status to a transmitter UE.

Grant-free transmissions, which are adopted in NR uplink transmissions, are also provided in NR sidelink transmissions, to improve the latency performance.

To alleviate resource collisions among different sidelink transmissions launched by different UEs, it enhances channel sensing and resource selection procedures, which also lead to a new design of PSCCH.

To achieve a high connection density, congestion control and thus the Quality of Service (QoS) management is supported in NR sidelink transmissions.

To enable the above enhancements, new physical channels and reference signals are introduced in NR (available in LTE before):

PSSCH (Physical Sidelink Shared Channel, SL version of PDSCH): The PSSCH is transmitted by a sidelink transmitter UE, which conveys sidelink transmission data, system information blocks (SIBs) for radio resource control (RRC) configuration, and a part of the sidelink control information (SCI).

PSFCH (Physical Sidelink, SL version of PUCCH): The PSFCH is transmitted by a sidelink receiver UE for unicast and groupcast, which conveys 1 bit information over 1 RB for the HARQ acknowledgement (ACK) and the negative ACK (NACK). In addition, channel state information (CSI) is carried in the medium access control (MAC) control element (CE) over the PSSCH instead of the PSFCH.

PSCCH (Physical Sidelink Common Control Channel, SL version of PDCCH): When the traffic to be sent to a receiver UE arrives at a transmitter UE, a transmitter UE should first send the PSCCH, which conveys a part of SCI (Sidelink Control information, SL version of DCI) to be decoded by any UE for the channel sensing purpose, including the reserved time-frequency resources for transmissions, demodulation reference signal (DMRS) pattern and antenna port, etc.

Sidelink Primary/Secondary Synchronization Signal (S-PSS/S-SSS): Similar to downlink transmissions in NR, in sidelink transmissions, primary and secondary synchronization signals (called S-PSS and S-SSS, respectively) are supported. Through detecting the S-PSS and S-SSS, a UE is able to identify the sidelink synchronization identity (SSID) from the UE sending the S-PSS/S-SSS. Through detecting the S-PSS/S-SSS, a UE is therefore able to know the characteristics of the UE transmitter the S-PSS/S-SSS. A series of process of acquiring timing and frequency synchronization together with SSIDs of UEs is called initial cell search. Note that the UE sending the S-PSS/S-SSS may not be necessarily involved in sidelink transmissions, and a node (UE/eNB/gNB) sending the S-PSS/S-SSS is called a synchronization source. There are 2 S-PSS sequences and 336 S-SSS sequences forming a total of 672 SSIDs in a cell.

Physical Sidelink Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB should be transmitted within the bandwidth of the configured BWP. The PSBCH conveys information related to synchronization, such as the direct frame number (DFN), indication of the slot and symbol level time resources for sidelink transmissions, in-coverage indicator, etc. The SSB is transmitted periodically at every 160 ms.

DMRS, phase tracking reference signal (PT-RS), channel state information reference signal (CSIRS): These physical reference signals supported by NR downlink/uplink transmissions are also adopted by sidelink transmissions. Similarly, the PT-RS is only applicable for FR2 transmission.

Another new feature is the two-stage sidelink control information (SCI). This is a version of the DCI for SL. Unlike the DCI, only part (first stage) of the SCI is sent on the PSCCH. This part is used for channel sensing purposes (including the reserved time-frequency resources for transmissions, demodulation reference signal (DMRS) pattern and antenna port, etc.) and can be read by all UEs while the remaining (second stage) scheduling and control information such as an 8-bit source identity (ID) and a 16-bit destination ID, NDI, RV and HARQ process ID is sent on the PSSCH to be decoded by the receiver UE.

In a manner similar to PRoSE in LTE, NR sidelink transmissions have the following two modes of resource allocations:

Mode 1: Sidelink resources are scheduled by a gNB.

Mode 2: The UE autonomously selects sidelink resources from a (pre-)configured sidelink resource pool(s) based on the channel sensing mechanism.

For the in-coverage UE, a gNB can be configured to adopt Mode 1 or Mode 2. For the out-of-coverage UE, only Mode 2 can be adopted.

As in LTE, scheduling over the sidelink in NR is done in different ways for Mode 1 and Mode 2. Mode 1 supports the following two kinds of grants:

Dynamic grant: When the traffic to be sent over sidelink arrives at a transmitter UE, this UE should launch the four-message exchange procedure to request sidelink resources from a gNB (SR on UL, grant, BSR on UL, grant for data on SL sent to UE). During the resource request procedure, a gNB may allocate a sidelink radio network temporary identifier (SL-RNTI) to the transmitter UE. If this sidelink resource request is granted by a gNB, then a gNB indicates the resource allocation for the PSCCH and the PSSCH in the downlink control information (DCI) conveyed by PDCCH with CRC scrambled with the SL-RNTI. When a transmitter UE receives such a DCI, a transmitter UE can obtain the grant only if the scrambled CRC of DCI can be successfully solved by the assigned SL-RNTI. A transmitter UE then indicates the time-frequency resources and the transmission scheme of the allocated PSSCH in the PSCCH, and launches the PSCCH and the PSSCH on the allocated resources for sidelink transmissions. When a grant is obtained from a gNB, a transmitter UE can only transmit a single TB. As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant can be obtained from a gNB, then the requested resources are reserved in a periodic manner. Upon traffic arriving at a transmitter UE, this UE can launch the PSCCH and the PSSCH on the upcoming resource occasion. In fact, this kind of grant is also known as grant-free transmissions.

In both dynamic grant and configured grant, a sidelink receiver UE cannot receive the DCI (since it is addressed to the transmitter UE), and therefore a receiver UE should perform blind decoding to identify the presence of PSCCH and find the resources for the PSSCH through the SCI.

When a transmitter UE launches the PSCCH, CRC is also inserted in the SCI without any scrambling.

In the Mode 2 resource allocation, when traffic arrives at a transmitter UE, this transmitter UE should autonomously select resources for the PSCCH and the PSSCH. To further minimize the latency of the feedback HARQ ACK/NACK transmissions and subsequently retransmissions, a transmitter UE may also reserve resources for PSCCH/PSSCH for retransmissions. To further enhance the probability of successful TB decoding at one shot and thus suppress the probability to perform retransmissions, a transmitter UE may repeat the TB transmission along with the initial TB transmission. This mechanism is also known as blind transmission. As a result, when traffic arrives at a transmitter UE, then this transmitter UE should select resources for the following transmissions:

1) The PSSCH associated with the PSCCH for initial transmission and blind retransmissions.

2) The PSSCH associated with the PSCCH for retransmissions.

Since each transmitter UE in sidelink transmissions should autonomously select resources for above transmissions, how to prevent different transmitter UEs from selecting the same resources turns out to be a critical issue in Mode 2. A particular resource selection procedure is therefore imposed to Mode 2 based on channel sensing. The channel sensing algorithm involves measuring RSRP on different subchannels and requires knowledge of the different UEs power levels of DMRS on the PSSCH or the DMRS on the PSCCH depending on the configuration. This information is known only after receiver SCI launched by (all) other UEs. The sensing and selection algorithm is rather complex.

4 Discovery Procedures

There are Device to Device (D2D) discovery procedures for detection of services and applications offered by other UEs in close proximity. This is part of LTE Release 12 and Release 13. The discovery procedure has two modes, mode A which is based on open announcements (broadcasts) and mode B which is request/response. The discovery mechanism is controlled by the application layer (ProSe). The discovery message is sent on the Physical Sidelink Discovery Channel (PSDCH) which is not available in NR. Also, there is a specific resource pool for announcement and monitoring of discovery messages. The discovery procedure can be used to detect UEs supporting certain services or applications before initiating direct communication.

5 Layer 2 (L2) UE-to-Network Relay

In the TR 23.752 v0.3.0 clause 6.7, the layer-2 based UE-to-Network relay is described.

5.1 General Information

In TR 23.752 v0.3.0 clause 6.7, the protocol architecture supporting a L2 UE-to-Network Relay UE is provided.

The L2 UE-to-Network Relay UE provides forwarding functionality that can relay any type of traffic over the PC5 link.

The L2 UE-to-Network Relay UE provides the functionality to support connectivity to the Fifth Generation System (5GS) for Remote UEs. A UE is considered to be a Remote UE if it has successfully established a sidelink (i.e., PC5 link in 3GPP NR) to the L2 UE-to-Network Relay UE (also referred to herein as a "relay UE"). A Remote UE can be located within Next Generation Radio Access Network (NG-RAN) coverage or outside of NG-RAN coverage.

FIG. 3 illustrates the protocol stack for the user plane transport, related to a Protocol Data Unit (PDU) Session, including a Layer 2 UE-to-Network Relay UE. The PDU layer corresponds to the PDU carried between the Remote UE and the Data Network (DN) over the PDU session. It is important to note that the two endpoints of the Packet Data Convergence Protocol (PDCP) link are the Remote UE and the gNB. The relay function is performed below PDCP. This means that data security is ensured between the Remote UE and the gNB without exposing raw data at the UE-to-Network Relay UE.

The adaptation relay layer within the UE-to-Network Relay UE can differentiate between signaling radio bearers (SRBs) and data radio bearers (DRBs) for a particular Remote UE. The adaption relay layer is also responsible for mapping PC5 traffic to one or more DRBs of the Uu. The definition of the adaptation relay layer is under the responsibility of RAN Working Group 2 (WG2).

FIG. 4 illustrates the protocol stack of the Non-Access Stratum (NAS) connection for the Remote UE to the NAS Mobility Management (NAS-MM) and NAS Session Management (NAS-SM) components. The NAS messages are transparently transferred between the Remote UE and 5G-RAN over the Layer 2 UE-to-Network Relay UE using:

PDCP end-to-end connection where the role of the UE-to-Network Relay UE is to relay the PDUs over the signaling radio bear without any modifications.

N2 connection between the 5G-AN and AMF over N2.

N3 connection AMF and SMF over N11.

The role of the UE-to-Network Relay UE is to relay the PDUs from the signaling radio bearer without any modifications.

5.2 Procedures

FIG. 5 is a reproduction of FIG. 6.7.3-1 from TR 23.752, which illustrates a procedure for connection establishment for indirection communication via a UE-to-Network Relay UE. Section 6.7 of TR 23.752 describes this procedure as follows:

0. If in coverage, the Remote UE and UE-to-Network Relay UE may independently perform the initial registration to the network according to registration procedures in TS 23.502 [2]. The allocated 5G GUTI of the Remote UE is maintained when later NAS signalling between Remote UE and Network is exchanged via the UE-to-Network Relay UE.

NOTE: The current procedures shown here assume a single hop relay.

1. If in coverage, the Remote UE and UE-to-Network Relay UE independently get the service authorization for indirect communication from the network.

2-3. The Remote UE and UE-to-Network Relay UE perform UE-to-Network Relay UE discovery and selection.

4. Remote UE initiates a one-to-one communication connection with the selected UE-to-Network Relay UE over PC5, by sending an indirect communication request message to the UE-to-Network Relay.

5. If the UE-to-Network Relay UE is in CM_IDLE state, triggered by the communication request received from the Remote UE, the UE-to-Network Relay UE sends a Service Request message over PC5 to its serving AMF.

The Relay's AMF may perform authentication of the UE-to-Network Relay UE based on NAS message validation and if needed the AMF will check the subscription data.

If the UE-to-Network Relay UE is already in CM_CONNECTED state and is authorised to perform Relay service then step 5 is omitted.

6. The UE-to-Network Relay UE sends the indirect communication response message to the Remote UE.

7. Remote UE sends a NAS message to the serving AMF. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF.

NOTE: It is assumed that the Remote UE's PLMN is accessible by the UE-to-Network Relay's PLMN and that UE-to-Network Relay UE AMF supports all S-NS-SAIs the Remote UE may want to connect to.

If Remote UE has not performed the initial registration to the network in step 0, the NAS message is initial registration message. Otherwise, the NAS message is service request message.

If the Remote UE performs initial registration via the UE-to-Network relay, the Remote UE's serving AMF may perform authentication of the Remote UE based on NAS message validation and if needed the Remote UE's AMF checks the subscription data.

For service request case, User Plane connection for PDU Sessions can also be activated. The other steps follow the clause 4.2.3.2 in TS 23.502 [2].

8. Remote UE may trigger the PDU Session Establishment procedure as defined in clause 4.3.2.2 of TS 23.502 [2].

9. The data is transmitted between Remote UE and UPF via UE-to-Network Relay UE and NG-RAN. The UE-to-Network Relay UE forwards all the data messages between the Remote UE and NG-RAN using RAN specified L2 relay method.

5.3 Service Continuity

As described in clause 4.5.4 of TR 38.836, L2 UE-to-Network Relay uses the RAN2 principle of the Rel-15 NR handover procedure as the baseline Access Stratum (AS) layer solution to guarantee service continuity (i.e. gNB hands over the remote UE to a target cell or target relay UE, including: (1) Handover preparation type of procedure between gNB and relay UE (if needed), (2) RRCReconfiguration to remote UE, remote UE switching to the target, and (3) Handover complete message, similar to the legacy procedure).

Exact content of the messages (e.g. handover command) is to be discussed in the 3GPP WI phase. This does not imply that inter-node messages will be sent over Uu.

Below, the common parts of intra-gNB cases and inter-gNB cases are captured.

a. Switching from Indirect to Direct Path

For service continuity of L2 UE-to-Network relay, the baseline procedure illustrated in FIG. 6 is used, in case of remote UE switching to direct Uu cell. The steps of the procedure of FIG. 6 are described in 3GPP TR 38.836 V1.0.0 as follows:

Step 1: Measurement configuration and reporting

Step 2: Decision of switching to a direct cell by gNB

Step 3: RRC Reconfiguration message to remote UE

Step 4: Remote UE performs Random Access to the gNB

Step 5: Remote UE feedback the RRCReconfigurationComplete to gNB via target path, using the target configuration provided in the RRC Reconfiguration message.

Step 6: RRC Reconfiguration to relay UE

Step 7: The PC5 link is released between remote UE and the relay UE, if needed.

Step 8: The data path switching.

NOTE: The order of step 6/7/8 is not restricted. Following are further discussed in WI phase, including:

Whether Remote UE suspends data transmission via relay link after step 3;

Whether Step 6 can be before or after step 3 and its necessity;

Whether Step 7 can be after step 3 or step 5, and its necessity/replaced by PC5 reconfiguration;

Whether Step 8 can be after step 5.

b. Switching from Direct to Indirect Path

For service continuity of L2 UE-to-Network relay, the baseline procedure illustrated in FIG. 7 is used, in case of remote UE switching to indirect relay UE. The steps of the procedure of FIG. 7 are described in TR 38.836 as follows:

Step 1: Remote UE reports one or multiple candidate relay UE(s), after remote UE measures/discoveries the candidate relay UE(s).

Remote UE may filter the appropriate relay UE(s) meeting higher layer criteria when reporting, in step 1.

The reporting may include the relay UE's ID and SL RSRP information, where the measurement on PC5 details can be left to WI phase, in step 1.

Step 2: Decision of switching to a target relay UE by gNB, and target (re)configuration is sent to relay UE optionally (like preparation).

Step 3: RRC Reconfiguration message to remote UE. Following information may be included: 1) Identity of the target relay UE; 2) Target Uu and PC5 configuration.

Step 4: Remote UE establishes PC5 connection with target relay UE, if the connection has not been setup yet.

Step 5: Remote UE feedback the RRCReconfiguration-Complete to gNB via target path, using the target configuration provided in RRCReconfiguration.

Step 6: The data path switching.

NOTE: Following are further discussed in WI phase, including:

Whether Step 2 should be after relay UE connects to the gNB (e.g. after step 4), if not yet before;

Whether Step 4 can be before step 2/3.

SUMMARY

Systems and methods are disclosed herein for failure monitoring and failure recovery.

A first aspect of the disclosure provides a method performed by a remote wireless communication device in a communications system. The method comprises: performing a failure recovery procedure. The failure recovery procedure comprises selecting either a prepared cell or a prepared relay wireless communication device as a target cell or a target relay wireless communication device for the failure recovery.

A second aspect of the disclosure provides a method performed by a relay wireless communication device in a communication system. The method comprises transmitting, to a remote wireless communication device, cell information comprising an indication of one or more cells to which the relay wireless communication device is connected.

In one embodiment, a method performed by a remote wireless communication device in a communications system comprises receiving, from a network node, a message that configures the remote wireless communication device to perform a path switch. The message comprises a value for a first timer. The method further comprises setting the first timer to the value comprised in the message and determining whether the path switch has failed based on whether the first timer expires before the path switch is successfully completed. In this manner, behavior of the remote wireless communication device in regard to patch switch failure is well-defined.

In one embodiment, the path switch is either: (a) a path switch from an indirect path between the remote wireless communication device and a serving cell through a serving relay wireless communication device to a direct path between the remote wireless communication device and a target cell for the path switch, (b) a path switch from a direct path between the remote wireless communication device and the serving cell to an indirect path between the remote wireless communication device and the target cell for the path switch via a target relay wireless communication device for the path switch, or (c) a path switch from a first indirect path between the remote wireless communication device and the serving cell via a serving relay wireless communication device to a second indirect path between the remote wireless communication device and the target cell for the path switch via a target relay wireless communication device for the path switch.

In one embodiment, the method further comprises responsive to receiving the message, starting the first timer and starting performance of a path switch procedure.

In one embodiment, the message is a Radio Resource Control (RRC) message.

In one embodiment, the first timer is an existing timer or a new timer.

In one embodiment, the path switch is a path switch from an indirect path between the remote wireless communication device and the serving cell through a serving relay wireless communication device to a direct path between the remote wireless communication device and the target cell. In one embodiment, the value of the first timer is a value that allows the remote wireless communication device to perform a defined or configured maximum number of random access attempts on the target cell. In one embodiment, the method further comprises stopping the first timer upon successful completion of random access on the target cell.

In one embodiment, the path switch is either a path switch from a direct path between the remote wireless communication device and the serving cell to an indirect path between the remote wireless communication device and the target cell via a target relay wireless communication device or a path switch from a first indirect path between the remote wireless communication device and the serving cell via a serving relay wireless communication device to a second indirect path between the remote wireless communication device and the target cell via a target relay wireless communication device. In one embodiment, the value of the first timer is a value that allows the remote wireless communication device to complete layer 2 link establishment and/or sidelink connection setup towards the target relay wireless communication device.

In one embodiment, the message is a RRC Reconfiguration message for conditional reconfiguration execution, the RRC Reconfiguration message comprising reconfiguration-WithSync.

In one embodiment, determining whether the path switch has failed comprises determining that the path switch has failed responsive to expiry of the first timer before the path switch is successfully completed. The method further comprises, responsive to determining that the path switch has failed, performing a failure recovery procedure responsive to determining that the path switch has failed. In one embodiment, the failure recovery procedure is a RRC re-establishment procedure.

In one embodiment, performing the failure recovery procedure comprises starting a second timer and, while the second timer is running, performing a selection procedure to select either a target cell or a target relay wireless communication device for failure recovery and attempting to connect to the selected target cell or the selected target relay wireless communication device for failure recovery. In one embodiment, the second timer is an existing timer or a new timer. In one embodiment, the second timer is set to a value that allows the remote wireless communication device to access the selected target cell or the selected target relay wireless communication device for failure recovery.

In one embodiment, performing the selection procedure comprises performing measurements on one or more potential target cells and selecting the target cell for failure recovery from the one or more potential target cells based on the performed measurements. In one embodiment, the one or more potential target cells comprise one or more previous serving cells of the remote wireless communication device and/or one or more neighbor cells of the serving cell of the remote wireless communication device. In one embodiment, performing the measurements on the one or more potential target cells comprises performing the measurements on the one or more potential target cells based on measurement configurations received by the remote wireless communication device from a network node before the path switch was requested.

In one embodiment, performing the selection procedure comprises performing measurements on one or more potential target relay wireless communication devices and selecting the target relay wireless communication device for failure recovery from the one or more potential target relay wireless communication devices based on the performed measurements. In one embodiment, performing the measurements on the one or more potential target relay wireless communication devices comprises, for each potential target relay wireless communication device, performing a measurement on an existing sidelink connection between the remote wireless communication device and the potential target relay wireless communication device or on a discovery message received by the remote wireless communication device from the potential target relay wireless communication device.

In one embodiment, performing the selection procedure comprises performing measurements on one or more potential target cells, performing measurements on one or more potential target relay wireless communication devices, and selecting a target cell or a target relay wireless communication device for failure recovery from the one or more potential target cells and the one or more potential target wireless communication devices based on the performed measurements. In one embodiment, selecting the target cell or the target relay wireless communication device for failure recovery comprises selecting the target cell or the target relay wireless communication device for failure recovery based on at least one of the following conditions: prioritize potential target cells, prioritize potential target wireless communication devices, and select either a potential target cell or a potential target wireless communication device based on measured radio channel quality. In one embodiment, selecting the target cell or the target relay wireless communication device for failure recovery comprises selecting the target cell or the target relay wireless communication device for failure recovery based on based on measured radio channel quality taking into consideration a defined or configured offset.

In one embodiment, the one or more potential target cells are one or more prepared cells. In one embodiment, the one or more potential target relay wireless communication devices are one or more potential target relay wireless communication devices that are connected to a prepared cell.

In one embodiment, performing the selection procedure comprises performing one of two or more defined selection schemes based on an indicator received from a network node.

In one embodiment, performing the failure recovery procedure further comprises stopping the second timer upon successfully connecting to the selected target cell or the selected target relay wireless communication device for failure recovery.

In one embodiment, the method further comprises sending a message to a network node that comprises: information that indicates that the path switch failed; information that indicates the wireless communication device, the failed target radio node or failed target cell served by the target radio node of the path switch, and/or the failed target relay wireless communication device; information that indicates a cause of the path switch failure; information that indicates a pair relation between the wireless communication device the target radio node of the path switch; one or more measurement results for neighbor cells or neighbor wireless communication devices (e.g., in terms of RSRP, RSRQ, RSSI, SINR, SIR, channel occupancy, or the like); a buffer status report; and/or power headroom report.

In one embodiment, performing the failure recovery procedure further comprises determining that recovery has failed responsive to expiry of the second timer before a connection to the selected target cell or the selected target relay wireless communication device for failure recovery is successfully made and, responsive to determining that recovery has failed, transitioning to an idle mode and performing a search procedure.

Corresponding embodiments of a remote wireless communication device are also disclosed. In one embodiment, a remote wireless communication device in a communications system is adapted to receive, from a network node, a message that configures the remote wireless communication device to perform a path switch. The message comprises a value for a first timer. The remote wireless communication device is further adapted to set the first timer to the value comprised in the message and determine whether the path switch has failed based on whether the first timer expires before the path switch is successfully completed.

In another embodiment, a remote wireless communication device in a communications system comprises one or more transmitters, one or more receivers, and processing circuitry associated with the one or more transmitters and the one or more receivers. The processing circuitry is configured to cause the remote wireless communication device to receive, from a network node, a message that configures the remote wireless communication device to perform a path switch. The message comprises a value for a first timer. The processing circuitry is further configured to cause the remote wireless communication device to set the first timer to the value comprised in the message and determine whether the path switch has failed based on whether the first timer expires before the path switch is successfully completed.

Embodiments of a computer program are also disclosed. In one embodiment, a computer program comprising instructions which, when executed on at least one processor, cause the at least one processor to carry out the method of operation of a remote wireless communication device according to any of the embodiments disclosed herein is provided. In one embodiment, a carrier containing the computer program is provided, wherein the carrier is one of an electronic signal, an optical signal, a radio signal, or a computer readable storage medium.

Embodiments of a method performed by a network node are also disclosed herein. In one embodiment, a method performed by a network node in a communications system comprises sending, to a remote wireless communication device, a message that configures the remote wireless communication device to perform a path switch. The message comprises a value for a first timer.

In one embodiment, the path switch is either: (a) a path switch from an indirect path between the remote wireless communication device and a serving cell through a serving relay wireless communication device to a direct path between the remote wireless communication device and a target cell for the path switch, (b) a path switch from a direct path between the remote wireless communication device and the serving cell to an indirect path between the remote wireless communication device and the target cell for the path switch via a target relay wireless communication device for the path switch, or (c) a path switch from a first indirect path between the remote wireless communication device and the serving cell via a serving relay wireless communication device to a second indirect path between the remote wireless communication device and the target cell for the path switch via a target relay wireless communication device for the path switch.

In one embodiment, the message is a RRC message.

In one embodiment, the first timer is an existing timer or a new timer.

In one embodiment, the path switch is a path switch from an indirect path between the remote wireless communication device and the serving cell through a serving relay wireless communication device to a direct path between the remote wireless communication device and the target cell. In one embodiment, the value of the first timer is a value that allows the remote wireless communication device to perform a defined or configured maximum number of random access attempts on the target cell.

In one embodiment, the path switch is either a path switch from a direct path between the remote wireless communication device and the serving cell to an indirect path between the remote wireless communication device and the target cell via a target relay wireless communication device or a path switch from a first indirect path between the remote wireless communication device and the serving cell via a serving relay wireless communication device to a second indirect path between the remote wireless communication device and the target cell via a target relay wireless communication device. In one embodiment, the value of the first timer is a value that allows the remote wireless communication device to complete layer 2 link establishment and/or sidelink connection setup towards the target relay wireless communication device.

In one embodiment, the message is a RRC Reconfiguration message for conditional reconfiguration execution, the RRC Reconfiguration message comprising reconfiguration-WithSync.

In one embodiment, the method further comprises receiving a message from the remote wireless communication device that comprises: information that indicates that the path switch failed; information that indicates the wireless communication device, the failed target radio node or failed target cell served by the target radio node of the path switch, and/or the failed target relay wireless communication device; information that indicates a cause of the path switch failure; information that indicates a pair relation between the wireless communication device the target radio node of the path switch; one or more measurement results for neighbor cells or neighbor wireless communication devices (e.g., in terms of RSRP, RSRQ, RSSI, SINR, SIR, channel occupancy, or the like); a buffer status report; and/or power headroom report.

In one embodiment, the method further comprises storing information about a pair relationship between the remote wireless communication device and a selected target relay wireless communication device for the path switch. In one embodiment, the method further comprises sending the information about the pair relationship to another network node. In one embodiment, the method further comprises clearing the information about the pair relationship upon receiving a message from the remote wireless communication device that indicates that a new connection has been established.

In one embodiment, the network node is a RAN node that serves the serving cell of the remote wireless communication device, and the method further comprises storing a UE context of the remote wireless communication device and/or sending the UE context of the remote wireless communication device to another RAN node that serves the target cell of the path switch.

In one embodiment, the network node is a RAN node that serves the serving cell of the remote wireless communication device, and a UE context of the remote wireless communication device is stored at the network node and/or at another RAN node that serves the target cell of the path switch, until a third timer expires.

In one embodiment, the method further comprises clearing the stored UE context upon receiving a message from the remote wireless communication device that indicates that a new connection has been established.

Corresponding embodiments of a network node are also disclosed. In one embodiment, a network node for a communications system is adapted to send, to a remote wireless communication device, a message that configures the remote wireless communication device to perform a path switch. The message comprises a value for a first timer.

In one embodiment, a network node for a communications system comprises processing circuitry configured to cause the network node to send, to a remote wireless communication device, a message that configures the remote wireless communication device to perform a path switch. The message comprises a value for a first timer.

In one embodiment, a computer program is provided, wherein the computer program comprises instructions which, when executed on at least one processor, cause the at least one processor to carry out the method of operation of a network node in accordance with any of the embodiments disclosed herein. In one embodiment, a carrier containing the computer program is provided, wherein the carrier is one of an electronic signal, an optical signal, a radio signal, or a computer readable storage medium.

Embodiments of a communication system and method of operation thereof are also disclosed herein. In one embodiment, a communication system including a host computer comprises processing circuitry configured to provide user data and a communication interface configured to forward user data to a cellular network for transmission to a UE, wherein the UE comprises a radio interface and processing circuitry. The UE's processing circuitry is configured to carry out the method of operation of a remote wireless communication device according to any of the embodiments disclosed herein. In one embodiment, the cellular communications system further comprises the UE. In one embodiment, the cellular network further includes a base station configured to communicate with the UE. In one embodiment, the processing circuitry of the host computer is configured to execute a host application, thereby providing the user data, and the UE's processing circuitry is configured to execute a client application associated with the host application.

In one embodiment, a method implemented in a communication system including a host computer, a base station, and a UE comprises, at the host computer, providing user data and, at the host computer, initiating a transmission carrying the user data to the UE via a cellular network comprising the base station. The UE carries out the method of operation of a remote wireless communication device according to any of the embodiments disclosed herein. In one embodiment, the method further comprises, at the UE, receiving the user data from the base station.

In another embodiment, a communication system including a host computer comprises a communication interface configured to receive user data originating from a transmission from a UE to a base station, wherein the UE comprises a radio interface and processing circuitry. The UE's processing circuitry configured to carry out the method of operation of a remote wireless communication device according to any of the embodiments disclosed herein. In one embodiment, the communication system further comprises the UE. In one embodiment, the communication system further comprises the base station, wherein the base station comprises a radio interface configured to communicate with the UE and a communication interface configured to forward to the host computer the user data carried by a transmission from the UE to the base station. In one embodiment, the processing circuitry of the host computer is configured to execute a host application and the UE's processing circuitry is configured to execute a client application associated with the host application, thereby providing the user data. In one embodiment, the processing circuitry of the host computer is configured to execute a host application, thereby providing request data, and the UE's processing circuitry is configured to execute a client application associated with the host application, thereby providing the user data in response to the request data.

In one embodiment, a method implemented in a communication system including a host computer, a base station, and a UE comprises, at the host computer, receiving user data transmitted to the base station from the UE, wherein the UE carries out the method of operation of a remote wireless communication device according to any of the embodiments disclosed herein. In one embodiment, the method further comprises, at the UE, providing the user data to the base station. In one embodiment, the method further comprises, at the UE, executing a client application, thereby providing the user data to be transmitted and, at the host computer, executing a host application associated with the client application. In one embodiment, the method further comprises, at the UE, executing a client application and, at the UE, receiving input data to the client application, the input data being provided at the host computer by executing a host application associated with the client application, wherein the user data to be transmitted is provided by the client application in response to the input data.

In one embodiment, a communication system including a host computer comprises processing circuitry configured to provide user data and a communication interface configured to forward the user data to a cellular network for transmission to a UE, wherein the cellular network comprises a base station having a radio interface and processing circuitry. The base station's processing circuitry configured to carry out the method of operation of a network node according to any of the embodiments disclosed herein. In one embodiment, the communication system further comprises the base station. In another embodiment, the communication system further comprises the UE, wherein the UE is configured to communicate with the base station. In one embodiment, the processing circuitry of the host computer is configured to execute a host application, thereby providing the user data and the UE comprises processing circuitry configured to execute a client application associated with the host application.

In one embodiment, a method implemented in a communication system including a host computer, a base station, and a UE comprises, at the host computer, providing user data and, at the host computer, initiating a transmission carrying the user data to the UE via a cellular network comprising the base station. The base carries out the method of operation of a network node according to any of the embodiments disclosed herein. In one embodiment, the method further comprises, at the base station, transmitting the user data. In one embodiment, the user data is provided at the host computer by executing a host application, and the method further comprises, at the UE, executing a client application associated with the host application.

In one embodiment, a communication system including a host computer comprising a communication interface configured to receive user data originating from a transmission from a UE to a base station, wherein the base station comprises a radio interface and processing circuitry. The base station's processing circuitry is configured to carry out the method of operation of a network node according to any of the embodiments disclosed herein. In one embodiment, the communication system further comprises the base station. In one embodiment, the communication system further comprises the UE, wherein the UE is configured to communicate with the base station. In one embodiment, the processing circuitry of the host computer is configured to execute a host application, and the UE is configured to execute a client application associated with the host application, thereby providing the user data to be received by the host computer.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 9A through 9C illustrate examples of direct to indirect path switching, indirect to indirect path switch, and indirect to direct path switch in which path switch failure monitoring and failure recovery are performed in accordance with some example embodiments of the present disclosure;

FIG. 11 is a flow chart that illustrates the operation of a remote wireless communication device in accordance with embodiments of the present disclosure;

DETAILED DESCRIPTION

Figure 1:
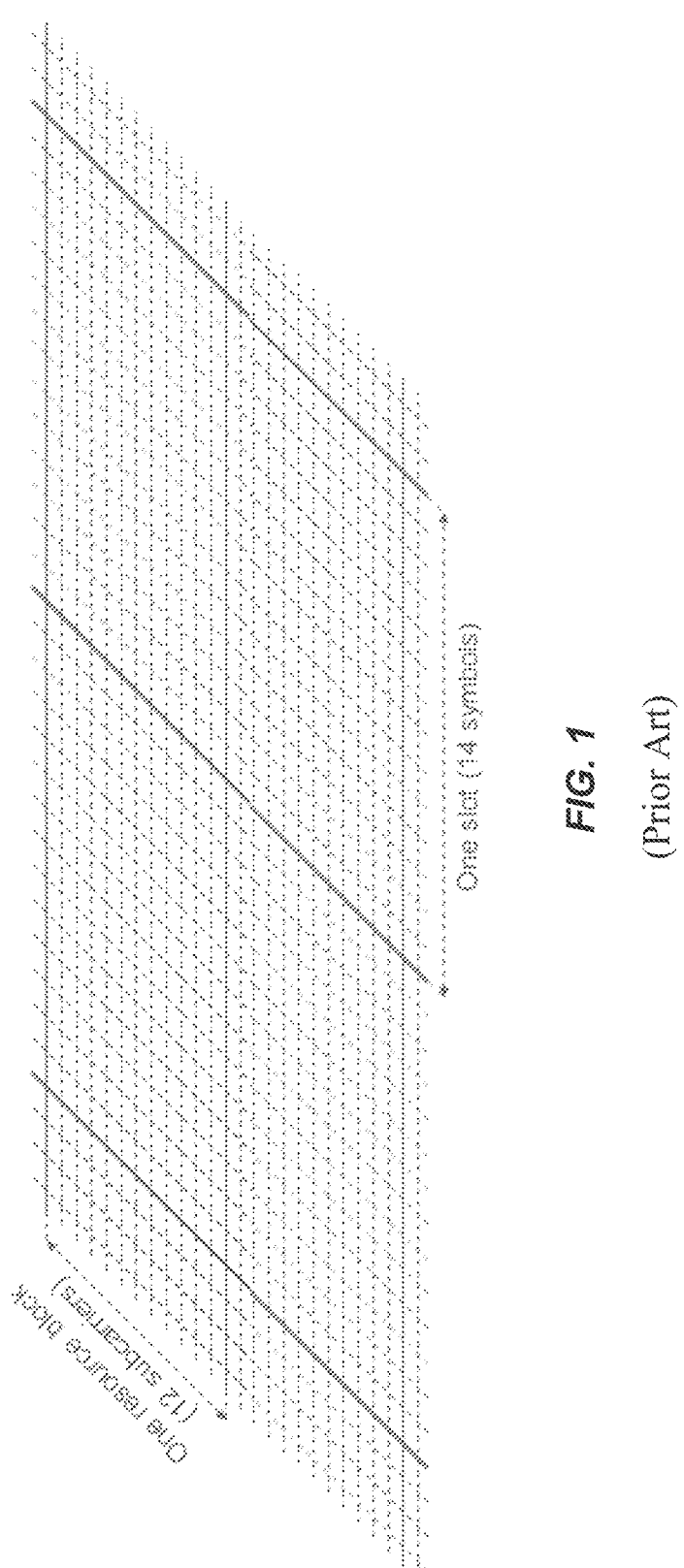
FIG. 1 illustrates the basic New Radio (NR) physical resource.
Figure 2:
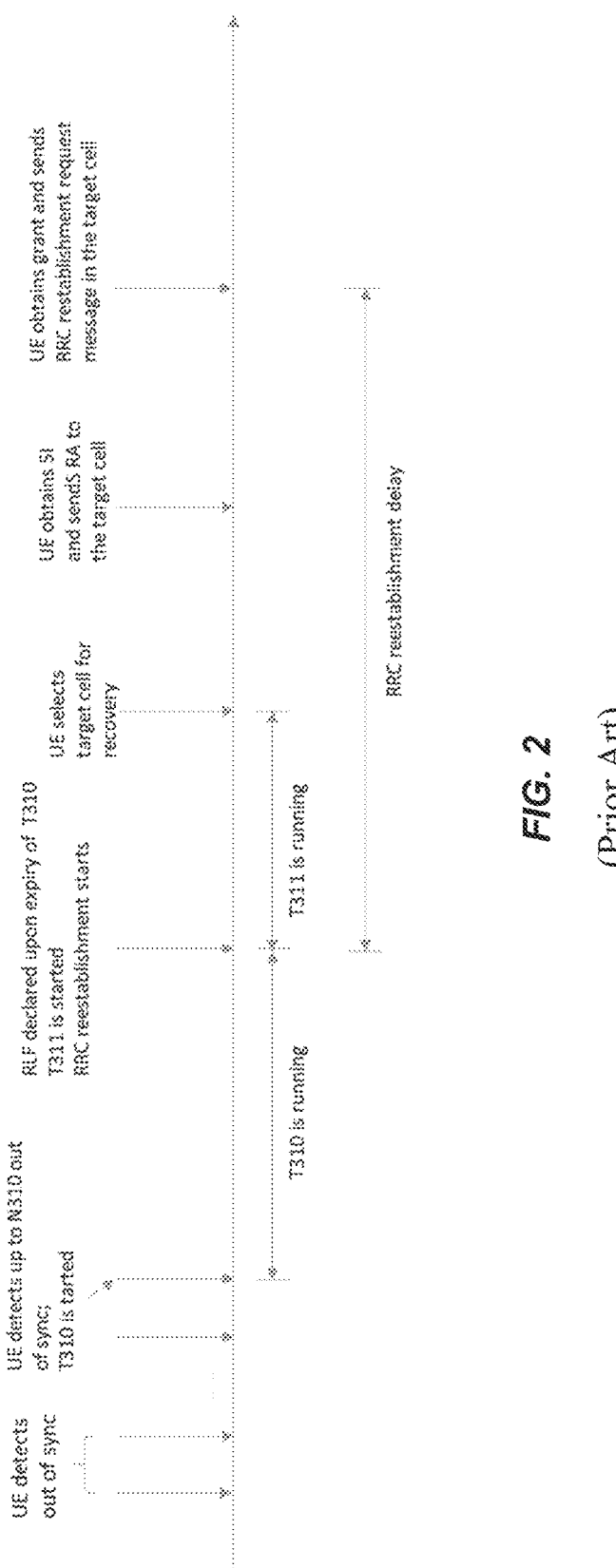
FIG. 2 illustrates radio link failure (RLF) monitoring of a serving cell followed by Radio Resource Control (RRC) re-establishment to a target cell in Long Term Evolution (LTE)
Figure 3:
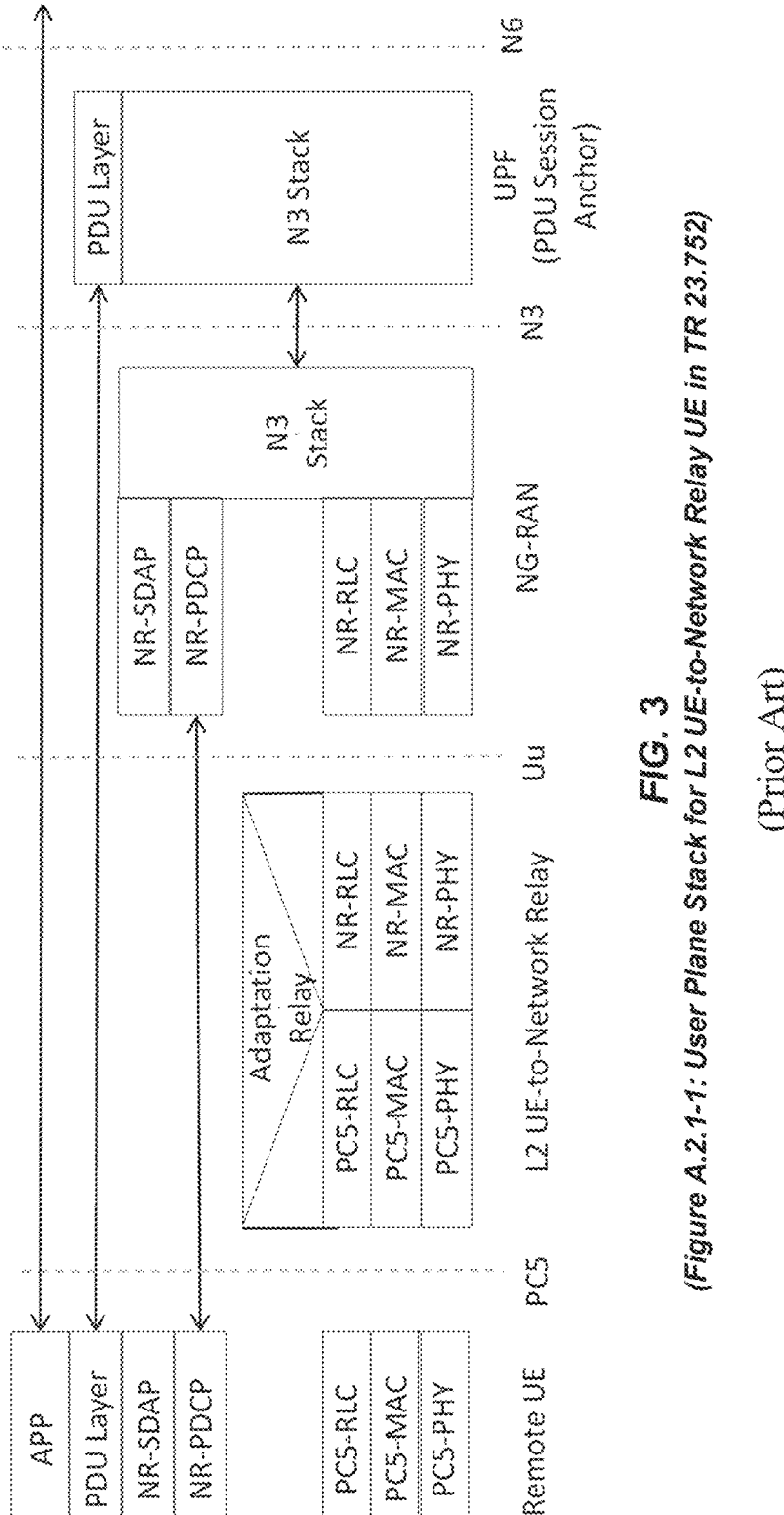
FIG. 3 illustrates the protocol stack for the user plane transport, related to a Protocol Data Unit (PDU) Session, including a Layer 2 UE-to-Network Relay UE. The PDU layer corresponds to the PDU carried between the Remote UE and the Data Network (DN) over the PDU session.
Figure 4:
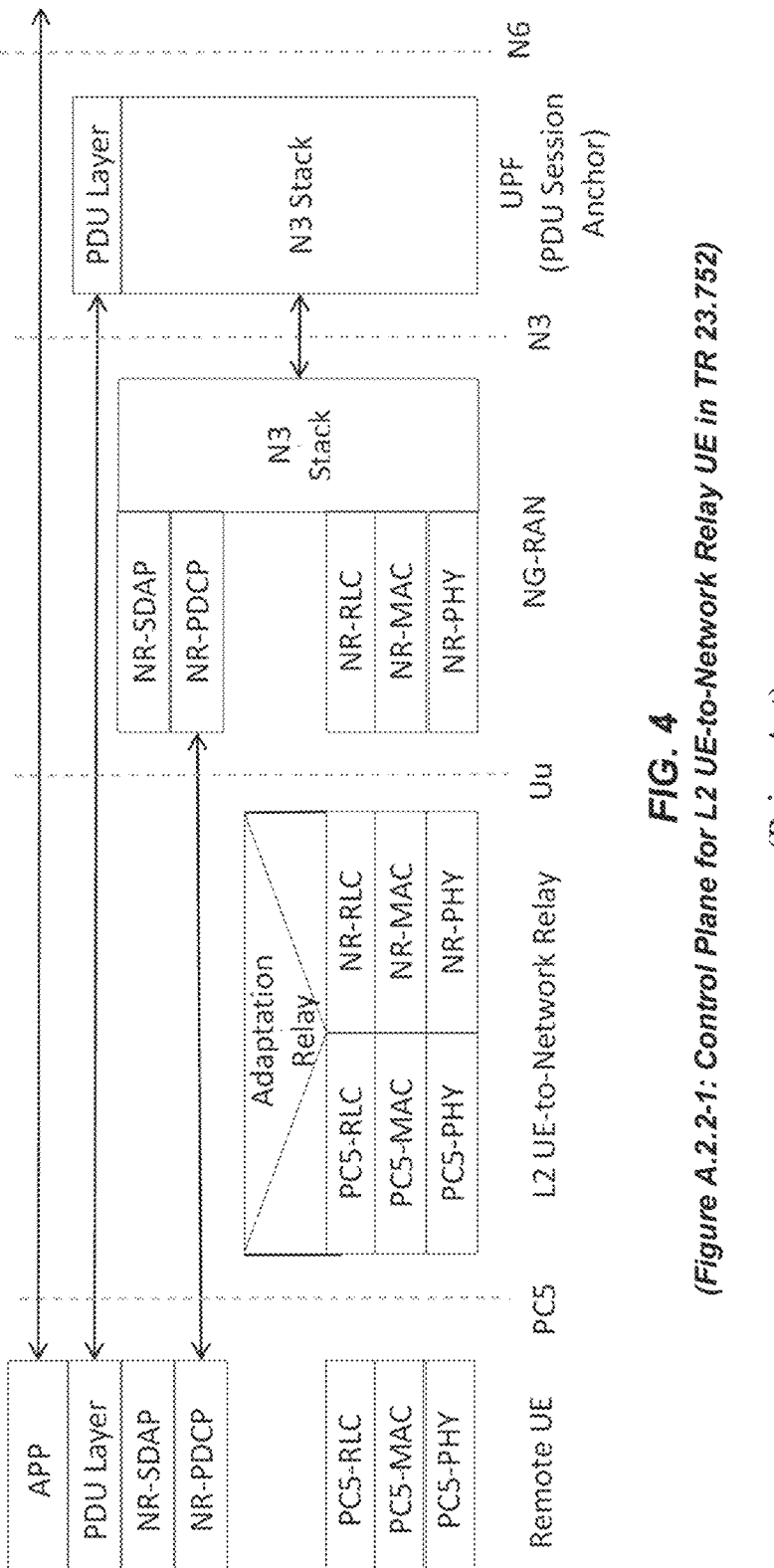
FIG. 4 illustrates the protocol stack of the Non-Access Stratum (NAS) connection for the Remote UE to the NAS Mobility Management (NAS-MM) and NAS Session Management (NAS-SM) components.
Figure 5:
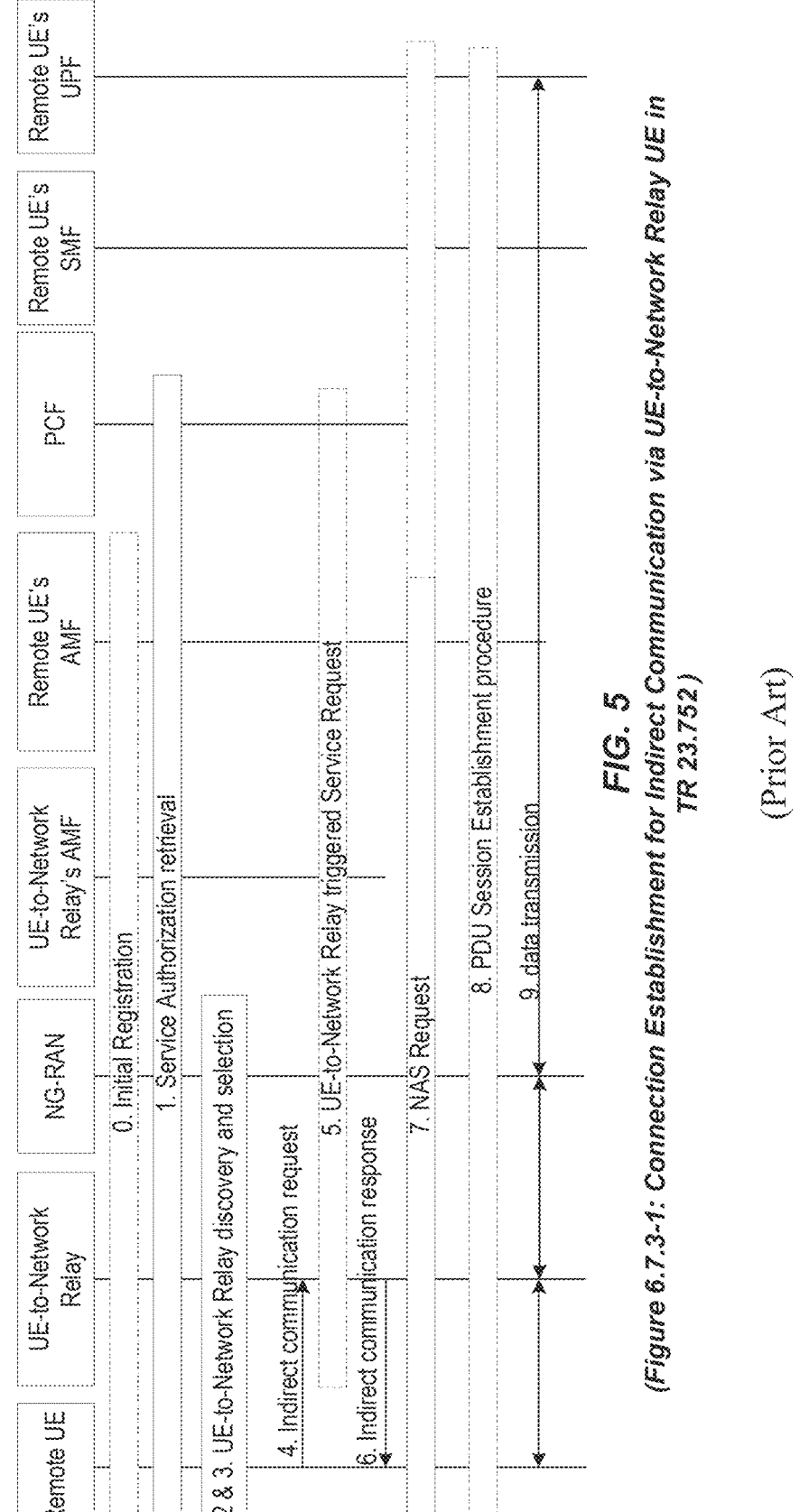
FIG. 5 is a reproduction of FIG. 6.7.3-1 from 3GPP TR 23.752, which illustrates a procedure for connection establishment for indirect communication via a UE-to-Network Relay UE.
Figure 6:
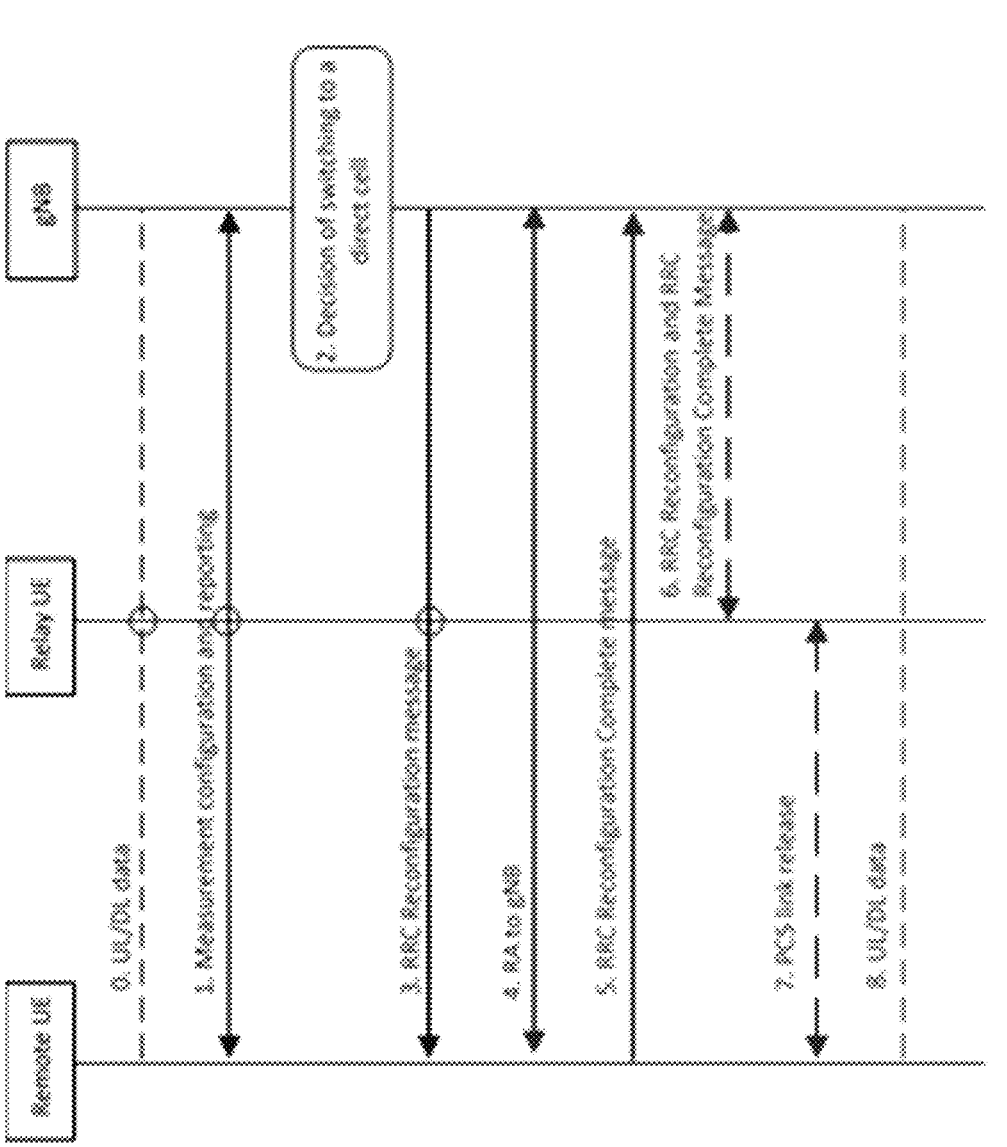
FIG. 6 illustrates the baseline procedure for service continuity for L2 UE-to-Network relay, in the case of remote UE switching to direct Uu cell.
Figure 7:
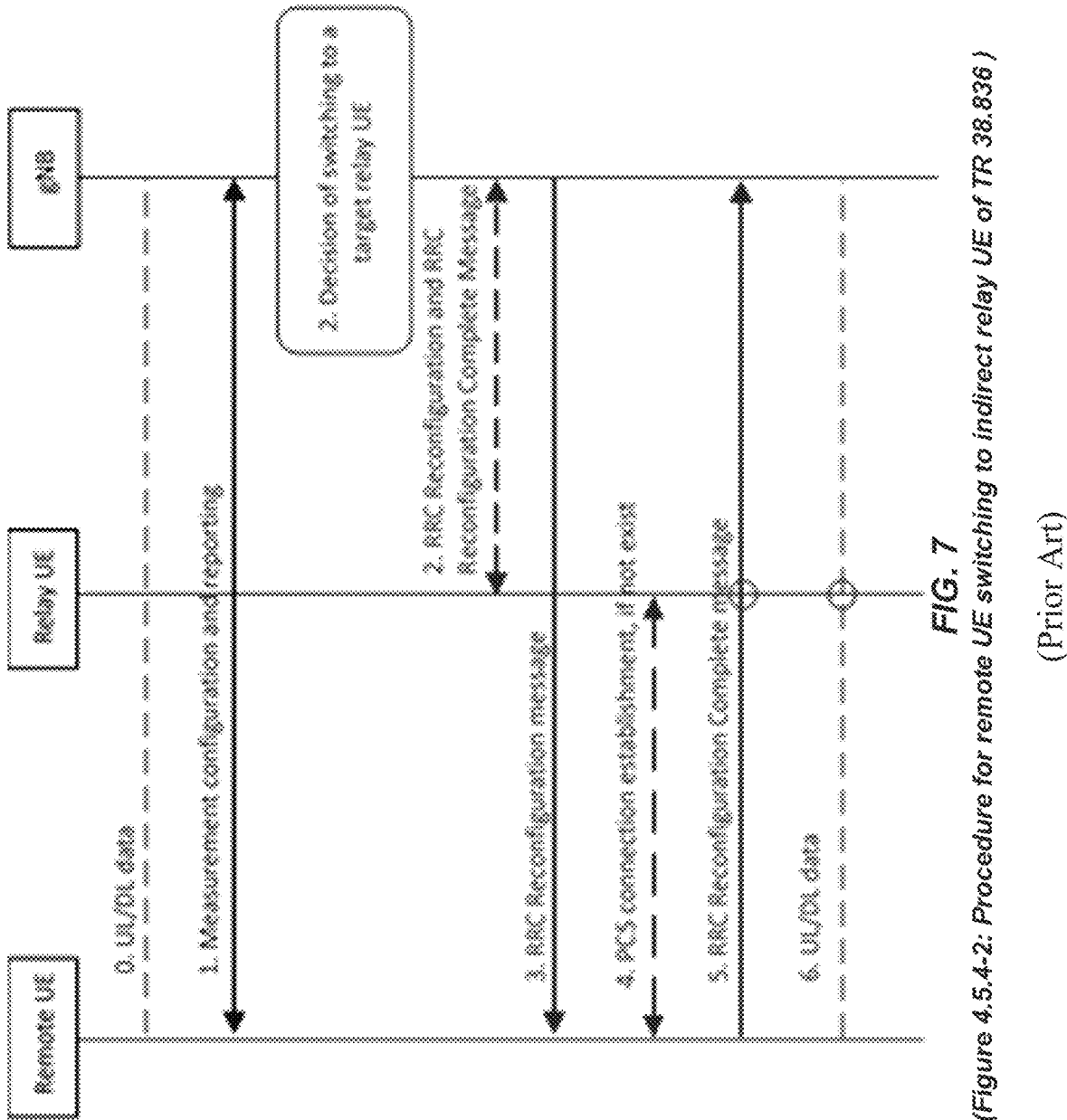
FIG. 7 illustrates the baseline procedure for service continuity of L2 UE-to-Network relay, in case of remote UE switching to indirect relay UE.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Path Switch: As used herein, a path switch is a switching of a connection of a wireless communication device (WCD) from one path (e.g., a direct path or an indirect path) to another path (e.g., an indirect path or a direct path). The two paths may be to the same or different cells.

Remote WCD: As used herein, a remote WCD is a WCD for which a path switch is initiated and for which the source path and/or the target path for the path switch is via a relay WCD.

Relay WCD: As used herein, a relay WCD is a WCD that operates as a relay (e.g., a L2 UE-to-Network relay) between a remote WCD and a network node or another WCD.

Direct Path: As used herein, the terms "direct connection" or "direct path" refer to a connection between a WCD and a network node (e.g., a RAN node such as a base station).

Indirect Path: As used herein, the terms "indirect connection" or "indirect path" refer to connection between a remote WCD and a network node (e.g., a RAN node such as a base station) via a relay WCD.

Prepared Cell: As used herein, a prepared cell for a particular WCD is a cell which has admitted the WCD before (e.g., during an earlier executed handover preparation phase) or a cell that obtains a UE context of the WCD (e.g., during a second phase of a radio link failure (RLF) procedure).

Prepared Relay WCD: As used herein, a prepared relay WCD for a particular remote WCD is a relay WCD candidate that is connecting to a prepared cell of the remote WCD. In other words, this WCD has a serving cell which is a prepared cell of the remote WCD.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In the 3GPP Release 17 Study Item (SI) on NR sidelink relay (RP-193253 "New SID: Study on NR sidelink relay"), the below objectives will be studied during 3GPP Rel-17 time frame:

This study item targets to study single-hop NR sidelink-based relay.

1. Study mechanism(s) with minimum specification impact to support the SA requirements for sidelink-based UE-to-network and UE-to-UE relay, focusing on the following aspects (if applicable) for layer-3 relay and layer-2 relay [RAN2];
   A. Relay (re-)selection criterion and procedure;
   B. Relay/Remote UE authorization;
   C. QoS for relaying functionality;
   D. Service continuity;

E. Security of relayed connection after SA3 has provided its conclusions;
F. Impact on user plane protocol stack and control plane procedure, e.g., connection management of relayed connection;

According to the above study objectives, layer-2 (L2) relay is to be studied as an important relay mechanism.

Service continuity during path switch is one study objective for the sidelink (SL) relay SI. During the recent RAN2 meetings, RAN2 has discussed the basic procedure for mobility scenarios where a remote UE switches between direct and indirect paths based on NR Rel-15 handover (HO) procedure as the baseline. The procedure has been described Section 5.3 of the Background above. In case a remote UE switches from a serving path (direct or indirect) to another indirect path, after reception of a RRCReconfiguration from the gNB, the remote UE needs to setup a PC5 unicast link towards the selected target relay UE if there is no PC5 unicast link available. The remote UE can use the existing L2 link establishment procedure as in Release 16 to setup the link (as captured in clause 6.3.3.1 of TS 23.287 v16.3.0). After that, the remote UE sends RRCReconfigurationSidelink to the target relay UE to establish/modify sidelink DRBs. During the whole procedure, the remote UE may trigger sidelink RLF due to one of the below events:
   1) Maximum number of consecutive HARQ DTX is reached
   2) Maximum number of RLC retransmissions is reached.
   3) PC5-RRC AS configuration failure by receiving RRCReconfigurationFailureSidelink In case sidelink RLF is triggered, the path switch procedure would fail. However, how the remote UE would react to the path switch failure is not clear.

Embodiments of systems and methods disclosed herein provide solutions to the aforementioned or other challenges. In particular, systems and methods are disclosed herein for failure monitoring and recovery, such as may occur following path switch failure. In one embodiment, at least one of the paths involved in the path switch is an indirect link through a relay WCD (e.g., a relay UE) using a sidelink between the remote WCD (e.g., remote UE) and the relay WCD. In one embodiment, the relay WCD is a Layer 2 relay UE (i.e., a Layer 2 UE-to-Network Relay UE).

In one embodiment, a failure monitoring and recovery procedure is proposed for a remote WCD (e.g., a remote UE), for example in case of path switch. The procedure is especially handing failures in cases in which the remote WCD performs a path switch to an indirect path from either a direct or indirect path.

The path switch to an indirect path may fail due to, for example, any of the below events:
   1) Maximum number of consecutive HARQ DTX is reached
   2) Maximum number of RLC retransmissions is reached.
   3) PC5-RRC AS configuration failure by receiving RRCReconfigurationFailureSidelink In one embodiment, responsive to determining that the path switch has failed (e.g., by expiry of an associated timer), the remote WCD triggers a failure recovery procedure. In the path switch failure recovery procedure, the remote WCD first remains in connected mode (e.g., RRC CONNECTED mode). In one embodiment, the remote WCD performs a search procedure that searches for a potential target cell (or potential target RAN node) or target relay WCD to which to perform connection re-establishment. If the remote WCD cannot find and re-establish connection to a target RAN node (or target cell) or a target relay WCD within a configured amount of time, the remote WCD transitions to an idle mode (e.g., RRC IDLE).

In some embodiments, one or more timers are utilized during the path switch failure recovery procedure to control the behavior of the remote WCD.

While not being limited to or by any particular advantage, some example advantages that may be provided by some of the embodiments described herein are as follows:

The remote WCD can perform a proper recovery procedure upon detection of an RLF in the SL link and/or the Uu link during a path switch (e.g., during a path switch from either a direct or indirect link to an indirect path).

The remote WCD is able to select either a target cell (or target RAN node) or a target relay WCD based on configured conditions and the measurement results.

Unnecessary down-switch to idle mode (e.g., RRC IDLE) from connected mode (e.g., RRC CONNECTED) is avoided.

Service QoS satisfaction for remote WCD is better ensured in case of RLF occurrence during a path switch (e.g., during a path switch from either a direct or indirect link to an indirect path).

Figure 8:
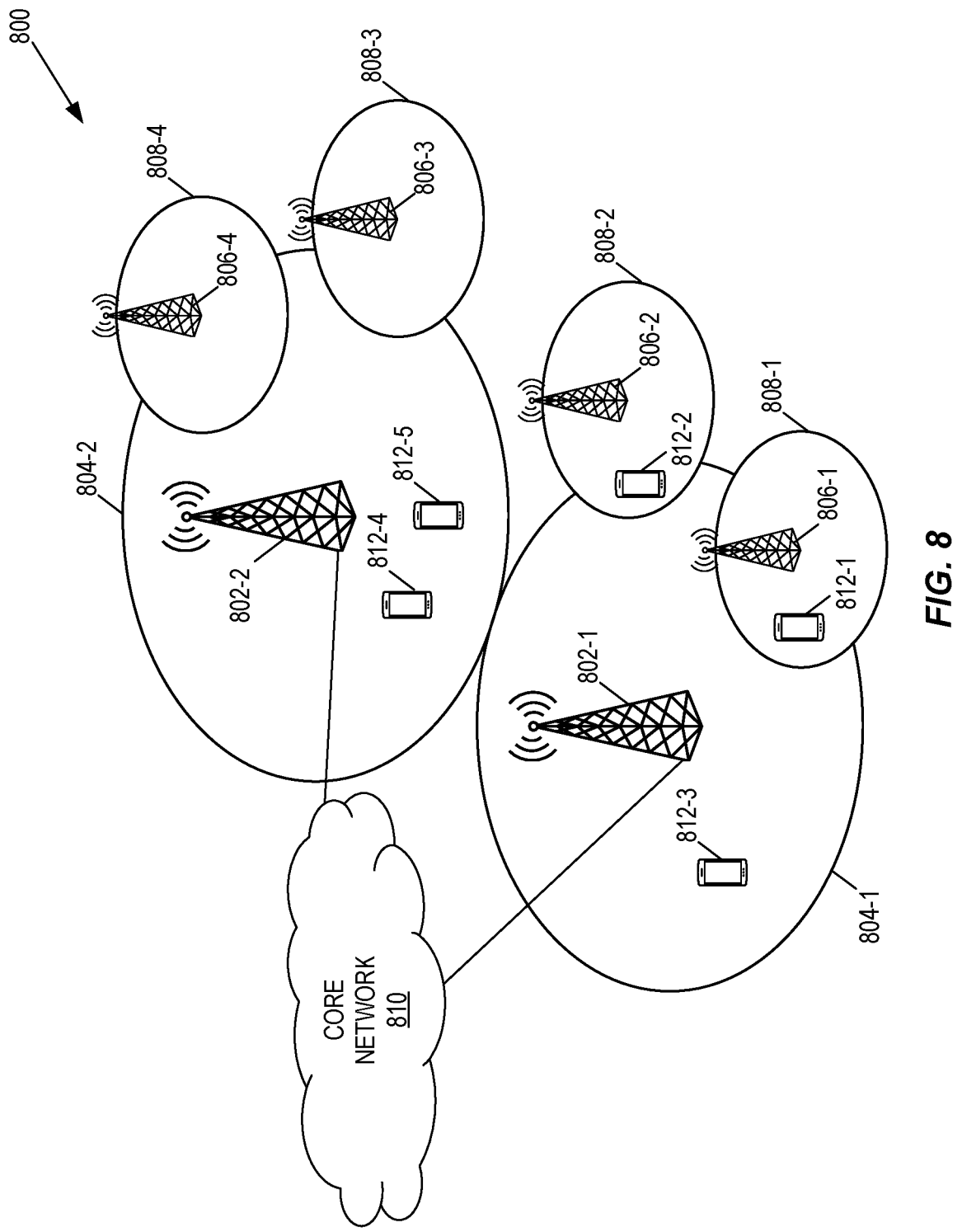
FIG. 8 illustrates one example of a cellular communications system in which embodiments of the present disclosure may be implemented.

FIG. 8 illustrates one example of a cellular communications system 800 in which embodiments of the present disclosure may be implemented. In the embodiments described herein, the cellular communications system 800 is a 5G system (5GS) including a Next Generation RAN (NG-RAN) and a 5G Core (5GC); however, the present disclosure is not limited thereto. Embodiments of the present disclosure may be implemented in other types of cellular communications systems (e.g., EPS) or in other types of wireless networks in which sidelink relaying is used. In this example, the RAN includes base stations 802-1 and 802-2, which in the 5GS include NR base stations (gNBs) and optionally next generation eNBs (ng-eNBs) (e.g., LTE RAN nodes connected to the 5GC), controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The RAN may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5GS is referred to as the 5GC. The base stations 802 (and optionally the low power nodes 806) are connected to the core network 810.

The base stations 802 and the low power nodes 806 provide service to wireless communication devices 812-1 through 812-5 in the corresponding cells 804 and 808. The wireless communication devices 812-1 through 812-5 are generally referred to herein collectively as wireless communication devices 812 and individually as wireless communication device 812. In the following description, the wireless communication devices 812 are oftentimes UEs and as such may sometimes be referred to as UEs 812, but the present disclosure is not limited thereto.

Figure 9A:
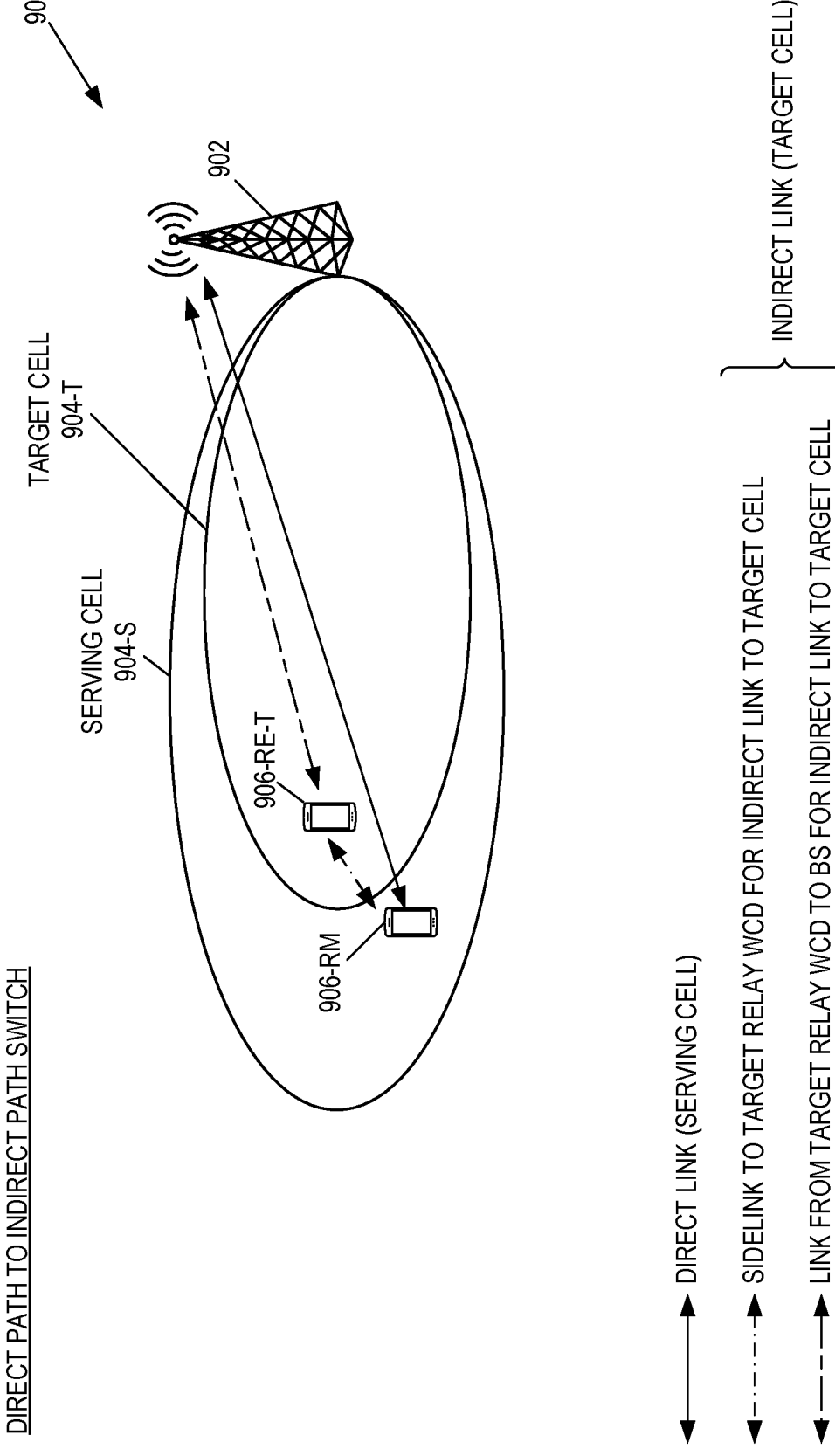
Figure 9C:
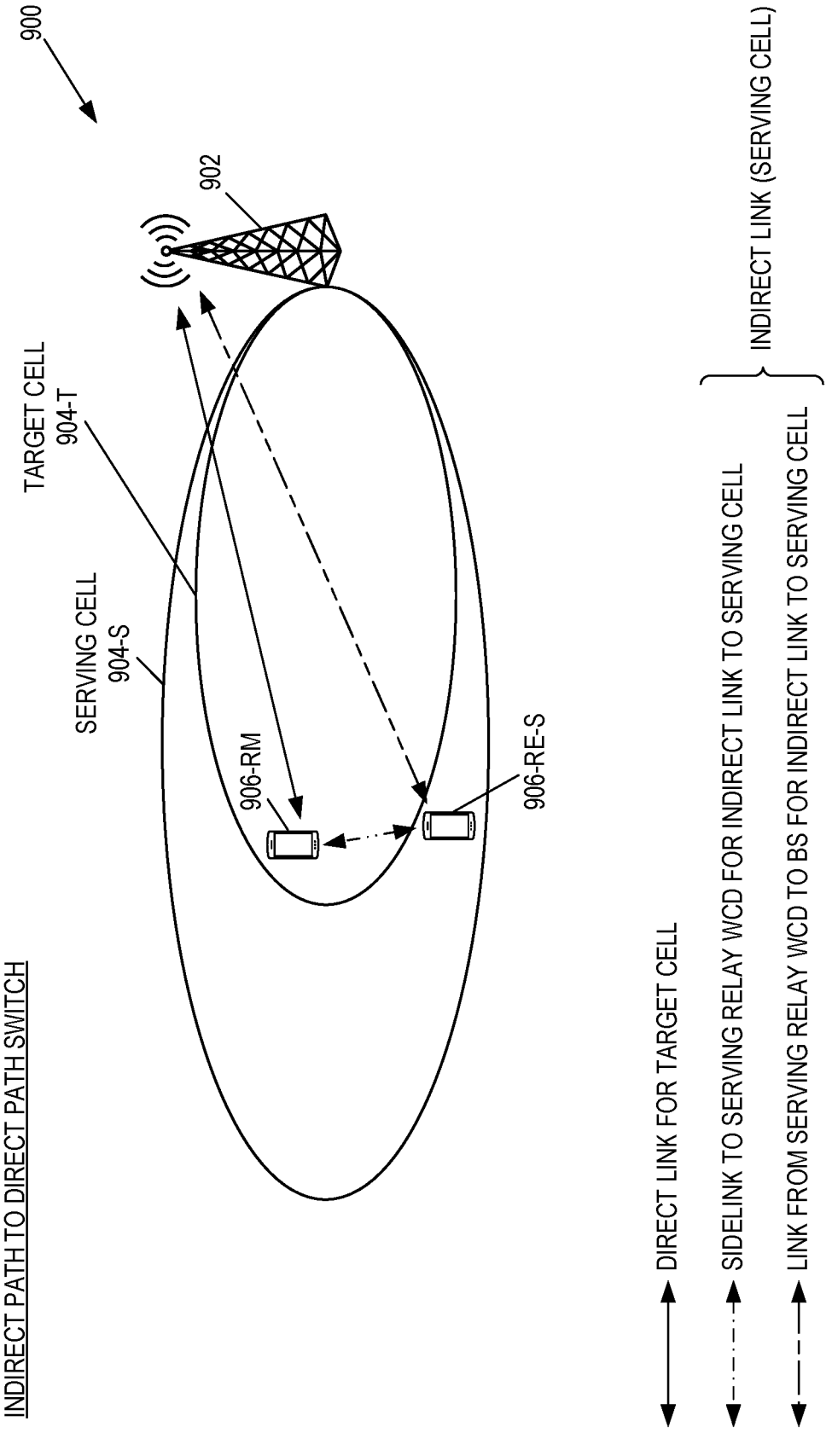

Embodiments of the present disclosure will now be described in more detail. These embodiments relate to path switch failure monitoring and recovery. In this regard, FIGS. 9A through 9C illustrate three examples of a path switch in a cellular communications system 900. The cellular communications system 900 may be, for example, the cellular communications system 800 of FIG. 8, but is not limited thereto. The cellular communication system 900 includes a network node 902 (e.g., a RAN node such as, e.g., a base station 802) that is associated to (e.g., serves) a serving cell 904-S of a remote WCD 906-RM and a target cell 904-T for a path switch for the remote WCD 906-RM. Note that while in the examples of FIGS. 9A through 9C show the source cell 904-S and the target cell 904-T as being associated to (e.g., served by) the same network node 902, the present disclosure is not limited thereto. Also note that while the source cell 904-S and the target cell 904-T are shown as being different cells in these examples, the source and target cells may alternatively be the same cell.

In particular, FIG. 9A illustrates a path switch from a direct path to an indirect path. As illustrated, the remote WCD 906-RM is initially connected to the network via a direct path from the remote WCD 906-RM to the serving cell 904-S (i.e., to the network node 902 on the serving cell 904-S). In response to a request from the network node 902, the remote WCD 906-RM attempts to perform a path switch from the direct path between the remote WCD 906-RM to the serving cell 904-S to an indirect path between the remote WCD 906-RM to the target cell 904-T for the path switch via a target relay WCD 906-RE-T. Note that the path switch may fail. Embodiments are disclosed herein for monitoring for such a path switch failure and, in some embodiments, performing a path switch failure recovery procedure to attempt to recover from a detected path switch failure.

FIG. 9B illustrates a path switch from a one indirect path to another indirect path. As illustrated, the remote WCD 906-RM is initially connected to the network via a first indirect path from the remote WCD 906-RM to the serving cell 904-S (i.e., to the network node 902 on the serving cell 904-S) via a serving relay WCD 906-RE-S. In response to a request from the network node 902, the remote WCD 906-RM attempts to perform a path switch from the first indirect path to a second indirect path between the remote WCD 906-RM to the target cell 904-T for the path switch via a target relay WCD 906-RE-T. Note that the path switch may fail. Embodiments are disclosed herein for monitoring for such a path switch failure and, in some embodiments, performing a path switch failure recovery procedure to attempt to recover from a detected path switch failure.

FIG. 9C illustrates a path switch from an indirect path to a direct path. As illustrated, the remote WCD 906-RM is initially connected to the network via an indirect path from the remote WCD 906-RM to the serving cell 904-S (i.e., to the network node 902 on the serving cell 904-S) via a serving relay WCD 906-RE-S. In response to a request from the network node 902, the remote WCD 906-RM attempts to perform a path switch from the indirect path to a direct path between the remote WCD 906-RM to the target cell 904-T for the path switch. Note that the path switch may fail. Embodiments are disclosed herein for monitoring for such a path switch failure and, in some embodiments, performing a path switch failure recovery procedure to attempt to recover from a detected path switch failure.

Now, embodiments relating to monitoring for a patch switch failure (e.g., a path switch failure for any of the three path switch scenarios show in FIGS. 9A through 9C) will be described. The embodiments are described in the context of NR, i.e., remote WCD and relay WCD are deployed in a same NR cell or different NR cells. The embodiments are also applicable to other relay scenarios including WCD to network relay or WCD to WCD relay where the remote WCD 906-RM and the relay WCD (e.g., relay WCD 906-RE-S or 906-T) may be based on LTE sidelink or NR sidelink, the connection between the relay WCD (e.g., relay WCD 906-RE-S or 906-RE-T) and the network node 902 (e.g., base station) may be LTE Uu or NR Uu.

In the embodiments described below, it is assumed that a remote WCD 906-RM connected to the network node 902 via a relay WCD (e.g., relay WCD 906-RE-S or 906-RE-T) is based on a L2 relay mechanism. The remote WCD 906-RM is in connected mode (e.g., RRC CONNECTED mode).

In a first embodiment, upon reception of a message (e.g., an RRC message or RRC signaling) from the (serving) network node 902 (e.g., a serving gNB) indicating a path switch, the remote WCD 906-RM switches from a serving path (i.e., direct or indirect path) to another target path (i.e., indirect or direct path). The received message carries not only necessary parameters for configuring the target path, but also carries a value of a first timer, based on which the remote WCD 906-RM starts the first timer after reception of the message. The first timer may be a newly defined timer or an existing timer, e.g., T304. If the remote WCD 906-RM cannot access the target entity (i.e., the target cell 904-T or associated target RAN node in the case that the target path is a direct path or the target relay WCD 906-RE-T in the case that the target path is an indirect path) successfully before the first timer has expired, the remote WCD 906-RM considers that the path switch has failed.

Note: For the path switch from a serving direct path to another direct path, the remote WCD 906-RM will just rely on the existing handover procedure. Therefore, the embodiments described herein only focus on other path switch cases including direct to indirect path switch, indirect to direct path switch, and indirect to indirect path switch.

The remote WCD 906-RM performs the following actions for different path switch cases. In case the remote WCD 906-RM switches to a direct path, the WCD 906-RM may perform similar actions as if the remote WCD 906-RM performs a handover to a target cell. That is, the first timer (e.g., T304) may be set to a value which allows the remote WCD 906-RM to perform a maximum number of random access attempts (e.g., a maximum number of random access preamble transmissions) on the corresponding target cell 904-T. The remote WCD 906-RM stops the first timer upon successful completion of random access on the corresponding target cell 904-T. If the remote WCD 906-RM is unable successfully complete random access on the target cell 904-T before the first timer expires, the remote WCD 906-RM determines that the path switch has failed.

In case the remote WCD 906-RM switches to an indirect path, the remote WCD 906-RM starts the first timer upon reception of the message indicating the path switch. The first timer is set to a value which allows the remote WCD 906-RM to complete layer 2 link establishment and/or sideline connection (e.g., PC5-RRC connection) setup towards the corresponding target UE 906-RE-T. For example, the remote WCD 906-RM stops the first timer when the remote WCD 906-RM receives the RRCReconfigurationCompleteSidelink for establishing necessary sidelink DRBs and/or SRBs. If the remote WCD 906-RM is unable successfully to connect to the target relay WCD

906-RE-T before the first timer expires, the remote WCD 906-RM determines that the path switch has failed (i.e., due to sidelink RLF during the path switch procedure).

In a second embodiment, the first embodiment is also applicable in case the remote WCD 906-RM performs conditional reconfiguration execution i.e. when applying a stored RRCReconfiguration message including reconfigurationWithSyncwhich indicates a path switch for the remote WCD 906-RM.

In a third embodiment, during the path switch procedure, if the remote WCD 906-RM determines that the path switch procedure has failed as described above, the remote WCD 906-RM initiates a failure recovery procedure, which is referred to herein as a path switch failure recovery procedure.

In a fourth embodiment, the failure recovery procedure is an RRC re-establishment procedure, which may be the same as or similar to the conventional RRC re-establishment procedure in LTE or NR but modified to account for an indirect path.

In a fifth embodiment, upon initiating the path switch failure recovery procedure, the remote WCD 906-RM starts a second timer. The second timer may be a new timer or an existing timer such as T311. The second timer is set to a value which allows the remote WCD 906-RM to access a selected target cell or selected target UE for path switch failure recovery. While the second timer is running, the remote WCD 906-RM stays in connected mode (e.g., RRC CONNECTED mode). Once the second timer has expired, the remote WCD 906-RM goes to idle mode (e.g., RRC IDLE). The second timer is stopped by the remote WCD 906-RM upon selection of a suitable cell or a suitable target relay UE.

While the second timer is running, the remote WCD 906-RM performs a selection procedure to each for and select a target cell (or target RAN node serving the target cell) or target relay for failure recovery. The selection procedure is, in some embodiments, performed in accordance with at least one of the below options.

Option 1: The remote WCD 906-RM is configured to search only target cells according to the cell search procedure as if the remote WCD 906-RM has triggered RLF on its direct Uu connection. The remote WCD 906-RM may measure its previous serving cells (i.e., connected via direct or indication connections when the path switch is triggered) and/or neighbor cells. The measurements may be performed according to measurement configurations received by the remote WCD 906-RM from the (serving) network node 902 (e.g., its serving gNB) when the remote WCD 906-RM was connected to the serving cell 904-S (i.e., directly or indirectly via a relay WCD 906-RE-S) before the path switch is triggered.

Option 2: The remote WCD 906-RM is configured to search only target relay WCDs. During this search procedure, the remote WCD 906-RM measures radio channel quality towards neighbor WCDs (e.g., other WCDs for which the remote WCD 906-RM has an existing connection or other WCDs from which the remote WCD 906-RM is able to detect a ProSe or D2D discovery signal). The measurement may be performed on an existing sidelink (e.g., an existing PC5 unicast link) for a neighbor WCD if there is already such a link established toward the neighbor WCD. In that case, the remote WCD 906-RM can measure radio signal strength of any possible reception on that link (e.g., RSRP of any reception on PSSCH, PSCCH, or PSFCH). Otherwise, the remote WCD 906-RM may monitor the radio signal strength in terms of possible discovery message reception. The remote WCD 906-RM may send a discovery message in its proximity. Based on reception of discovery messages from neighbor WCDs, the remote WCD 906-RM measures radio channel quality on each neighbor sidelink (i.e., between the remote WCD 906-RM and each neighbor WCD) in terms of metrics such as, e.g., RSRP, RSRQ, RSSI, SINR, SIR, channel occupancy/channel busy ratio etc. Based on the measurement results, the remote WCD 906-RM selects the best target WCD (i.e., with the strongest radio channel quality) as the target relay WCD for failure recovery. If multiple suitable target relay WCDs are found (e.g., multiple target relay UEs having measured radio channel quality above a defined or configured threshold), the remote WCD 906-RM may select any one of them as the target for failure recovery.

Option 3: The remote WCD 906-RM is configured to search both target cells and target relay WCDs. After the search, the remote WCD 906-RM may find both one or multiple best target cells and/or best target relay WCDs. To enable selection when there are multiple suitable target cells/relay WCDs available, the remote WCD 906-RM can be further configured with some selection criteria which may contain at least one of the below:

Condition 1: Prioritize target cells. In this case, the remote WCD 906-RM will only select target cells if there is any.

Condition 2: Prioritize target relay WCDs. In this case, the remote WCD 906-RM will only select target relay WCDs if there is any.

Condition 3: Select either target cell or target relay WCD in terms of measured radio channel quality. In one embodiment, in order to compare between target cells and target relay WCDs, a specific offset may be configured to the remote WCD 906-RM considering the difference of communication range and/or the transmission power.

For any of the above options, the relevant configuration is signaled to the remote WCD 906-RM when the remote WCD 906-RM has connection to the serving cell 904-S (i.e., directly or indirectly via a relay WCD 906-RE-S). The configuration on which option that remote WCD 906-RM is to apply may be signaled as an indicator of one of these options (e.g., option index) or as a threshold of radio channel quality of radio link. In addition, the remote WCD 906-RM may stop measuring target cells for a while in case its measured strongest target cell (e.g., previous serving cells i.e., connected via direct or indication connections when the path switch is triggered, or any neighbor cell) is below a configured threshold. In this case, the remote WCD 906-RM indicates that there is not any neighbor cell with sufficiently good connection. Therefore, there is no point to waste WCD power to measure neighbor cells.

During the selection procedure, in one embodiment, the remote WCD 906-RM first selects (i.e., prioritizes selection of) a prepared target cell or a prepared target relay WCD if there is any. In addition, each relay WCD may indicate cell information (e.g., information that indicates which cell(s) the relay WCD is connected to or information that indicates whether the relay WCD is connected to a prepared cell(s) of the remote WCD 906-RM) in a signaling, which is sent to the remote WCD 906-RM. When the remote WCD 906-RM selects a target relay WCD(s), this cell information can be considered. This cell information may be signaled via at least one of the below signaling mechanisms:

Discovery signaling

RRC signaling (e.g., PC5-RRC)

MAC CE

L1 signaling (such as SCI)

Control PDUs of a protocol layer (e.g., SDAP, PDCP, RLC or adaptation layer)

After connecting to a target cell or a target relay WCD for failure recovery, the remote WCD 906-RM activity can be resumed (i.e., the remote WCD 906-RM stays in connected mode) since the previous UE context can be retrieved by inter-cell communication. However, when a prepared cell or a prepared relay WCD is not available, the remote WCD 906-RM selects an unprepared cell, or an unprepared relay WCD. In this case, the remote WCD 906-RM may not recover from the failure successfully before the second timer has expired, in which case the remote WCD 906-RM transitions to RRC IDLE and tries to setup the radio connection afterwards. In this case, activity of the remote WCD 906-RM cannot be resumed.

In case the remote WCD 906-RM has selected a target cell or target relay WCD to perform recovery, the second timer is stopped.

In one embodiment, after the remote WCD 906-RM has recovered from the path switch failure, e.g., re-established RRC, the remote WCD 906-RM sends a signaling (e.g., a message) to the network (e.g., to the serving network node 902 or serving gNB) which carries one or more of the following:

An indicator indicating the path switch that has failed, information that indicates the involved nodes including the remote WCD 906-RM and the failed target cell 904-T or the failed target relay WCD 906-RE-T, information that indicates one or more causes of the path switch failure (e.g., maximum number of consecutive HARQ DTX is reached; Maximum number of RLC retransmissions is reached or PC5-RRC AS configuration failure by receiving RRCReconfigurationFailureSidelink).

A pair relation information about a pair relation between the remote WCD 906-RM and the target relay WCD 906-RE-T of the failed path switch, which indicates that the failed path switch is for the remote WCD 906-RM to setup the relay connection via this target relay WCD 906-RE-T may, for example, be stored at the serving network node 902 (e.g., serving gNB) and/or provided to another network node (e.g., the target gNB of the successful recovery).

Measurement results of other neighbor cells or neighbor WCDs in terms of, e.g., RSRP, RSRQ, RSSI, SINR, SIR, channel occupancy etc.

A buffer status report

A power headroom report

The signaling described above may be, for example, the RRC signaling SidelinkUEInformationNR. The signaling may be another RRC signaling.

Figure 10:
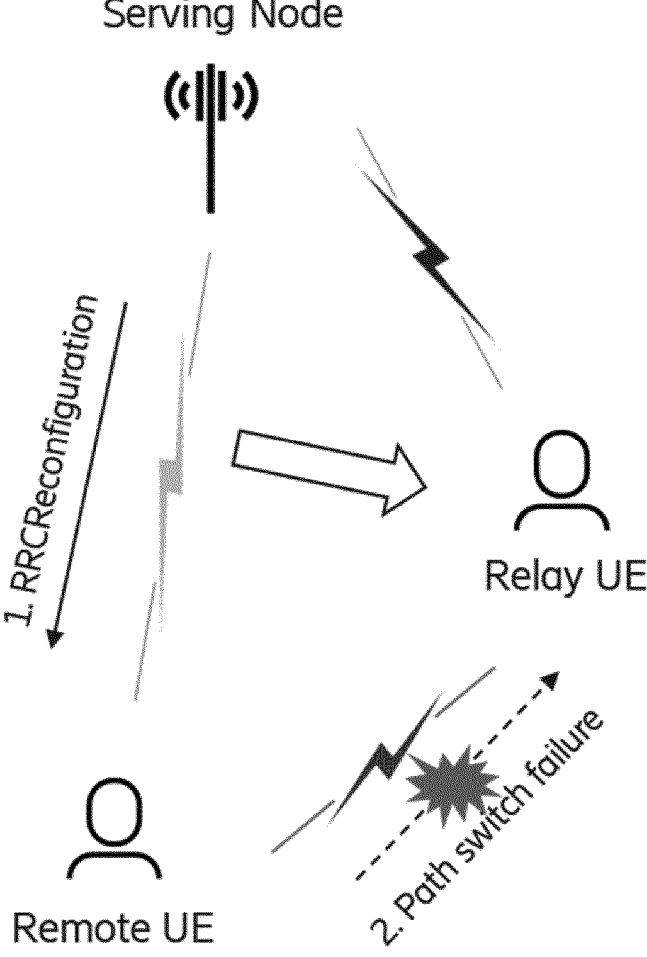
FIG. 10 illustrates an example of a remote UE that experiences a path switch failure and triggers a failure recovery procedure in accordance with embodiments of the present disclosure.

An example of a remote UE that experiences a path switch failure and triggers a failure recovery procedure in accordance with the embodiments described above is illustrated in FIG. 10.

In a sixth embodiment, in case the remote WCD 906-RM goes to idle mode (e.g., RRC IDLE) when a failed path switch cannot be recovered by the failure recovery procedure, the remote WCD 906-RM performs a search procedure similar to that described in the fifth embodiment. Using this selection procedure, the remote WCD 906-RM selects an unprepared target cell or unprepared target relay WCD to setup the connection. After the connection has been established, the remote WCD 906-RM may report the similar information as covered in the fifth embodiment to the network (e.g., to the serving network node 902 or serving gNB or to the network node or gNB after re-connection).

In a seventh embodiment, in case a path switch to an indirect path is triggered for the remote WCD 906-RM, before sending the message (e.g., RRC reconfiguration) to the remote WCD 906-RM indicating the path switch, the serving network node 902 (e.g., serving gNB) stores pair relationship information for the pair relation between the remote WCD 906-RM and the selected target relay WCD 906-RE-T for the path switch. If the target relay WCD 906-RE-T belongs to a different network node (e.g., a different gNB), the serving network node 902 may also send the pair relationship information to the target network node (e.g., target gNB). In one embodiment, the pair relationship information includes information that indicates that the target relay WCD 906-RE-T serves as a relay to the remote WCD 906-RM. In one embodiment, the pair relationship information is stored in the relevant network nodes (e.g., relevant gNBs) until the relay path is released. In case of path switch failure, the remote WCD 906-RM is not able to connect to the new (target) path. In this case, the pair relationship information is kept in the target network node (e.g., target gNB) for a configured amount of time. For instance, a timer can be started in the target network node when the target network node receives a request message from the serving network node 902 indicating that the path switch needs to be prepared. Similarly, a timer can be started at the serving network node when the serving network node sends an RRC signaling to the remote WCD 906-RM indicating that the path switch is initiated. When the timer is expired, the pair relationship information is cleared. The timer is stopped when the remote WCD 906-RM completes the path switch successfully while the timer is running.

In an eighth embodiment, as described in previous embodiments, in case of a path switch failure, the remote WCD 906-RM triggers a failure recovery procedure (e.g., RRC re-establishment procedure), and a UE context of the remote WCD 906-RM is stored in the relevant network nodes (i.e., the serving network node 902 (e.g., the serving gNB) and/or the target network node (e.g., the target gNB)) for a configured amount of time. A timer can be started at the target network node when the target network node has received a request message from the serving network node 902 indicating that the path switch needs to be prepared. Similarly, a timer can be started at the serving network node 902 when the serving network node 902 sends a message (e.g., an RRC message or RRC signaling) to the remote WCD 906-RM indicating the path switch is initiated. The stored UE context of the remote WCD 906-RM is cleared if the timer is expired. The timer is stopped when the remote WCD 906-RM completes the path switch successfully while the timer is running.

In a ninth embodiment, for the seventh embodiment and the eighth embodiment, the stored contexts of the remote WCD 906-RM and/or the stored paring relationship information may be cleared in the concerned nodes (i.e., the serving and/or target network nodes) only in case a signaling is received indicating that the stored information of the remote WCD 906-RM needs to be cleared. The signaling may be sent by the remote WCD 906-RM after the remote WCD 906-RM has established a new connection, i.e., the remote WCD 906-RM goes to idle (e.g., RRC IDLE) and establishes a new connection. The signaling may be also generated by the target network node (e.g., target gNB). For example, the target network node cannot receive a complete message from the remote WCD 906-RM within an expected time period. The target network node would then clear all stored information related to the remote WCD 906-RM. Meanwhile, the target network node may send a signaling to the serving network node to clear the stored information related to the remote WCD 906-RM.

FIG. 11 is a flow chart that illustrates the operation of the remote WCD 906-RM in accordance with at least some of the embodiments described above. As illustrated, the remote WCD 906-RM receives, from the network node 902, a message that triggers, or indicates, a path switch for the remote WCD 906-RM (step 1100). The message is, in some embodiments, an RRC message (e.g., an RRC Reconfiguration message) or an RRC message for conditional reconfiguration execution i.e. when applying a stored RRCReconfiguration message including reconfigurationWithSync which indicates a path switch for the remote WCD 906-RM, as discussed above. The receive message includes a value for a first timer for use for determining a path switch failure, as described above. In addition, the message may include additional parameters related to the path switch such as, for example, one or more parameters that enable the remote WCD 906-RM to connect to the target entity (i.e., the target cell 904-T or the target relay WCD 906-RE-T) for the path switch. Additional details regarding the message received in step 1100 and the value of the first timer comprised therein are provided above and are equally applicable here. As also described above, in one embodiment, either the source path or the target path for the path switch is an indirect path. More specifically, in one embodiment, the path switch is either a direct to indirect path switch, an indirect to indirect path switch, or an indirect to direct path switch, as described above.

Responsive to the received message, the remote WCD 906-RM sets the first timer to the value included in the received message (step 1102), starts the first timer (step 1104), and starts performance of the triggered path switch (step 1106). The remote WCD 906-RM stops the first timer if the remote WCD 906-RM successfully completes the path switch (e.g., stops the first timer upon successful random access to the target cell 904-T in the case where the target path is a direct path or successfully connects to the target relay WCD 906-RE-T in the case where the target path is an indirect path) (step 1108). The remote WCD 906-RM determines whether there is a path switch failure for the path switch based on the first timer (step 1110). More specifically, as discussed above, the remote WCD 906-RM determines that the path switch failed if the first timer expires before the remote WCD 906-RM is able to successfully connect to the target entity for the path switch (step 1110A). Conversely, the remote WCD 906-RM determines that the path switch was successful if the first timer is stopped in step 1108 before expiry of the first timer (step 1110B).

In some embodiments, responsive to determining that the path switch failed in step 1110A, the remote WCD 906-RM performs a path switch failure recovery procedure (step 1112). The recovery procedure may be in accordance with any of the respective embodiments described above. The details of those embodiments are equally applicable here. For example, in one embodiment, the failure recovery procedure is an RRC re-establishment procedure. As another example, in some embodiment, the failure recovery procedure is in accordance with the fifth embodiment described above. If failure recovery fails, the remote WCD 906-RM transitions to idle mode and may take one or more additional actions (e.g., perform cell search), as described above with respect to the sixth embodiment (step 1113). Note that one or more aspects of step 1113 may alternatively be performed within step 1112.

In some embodiments, the remote WCD 906-RM sends a message to the network (e.g., to the serving network node 902 or some other network node such as, e.g., the target network node, e.g., after successful path switch failure recovery) (step 1114). This message may include various information, as described in the embodiments above (e.g., the fifth embodiment).

Figure 12:
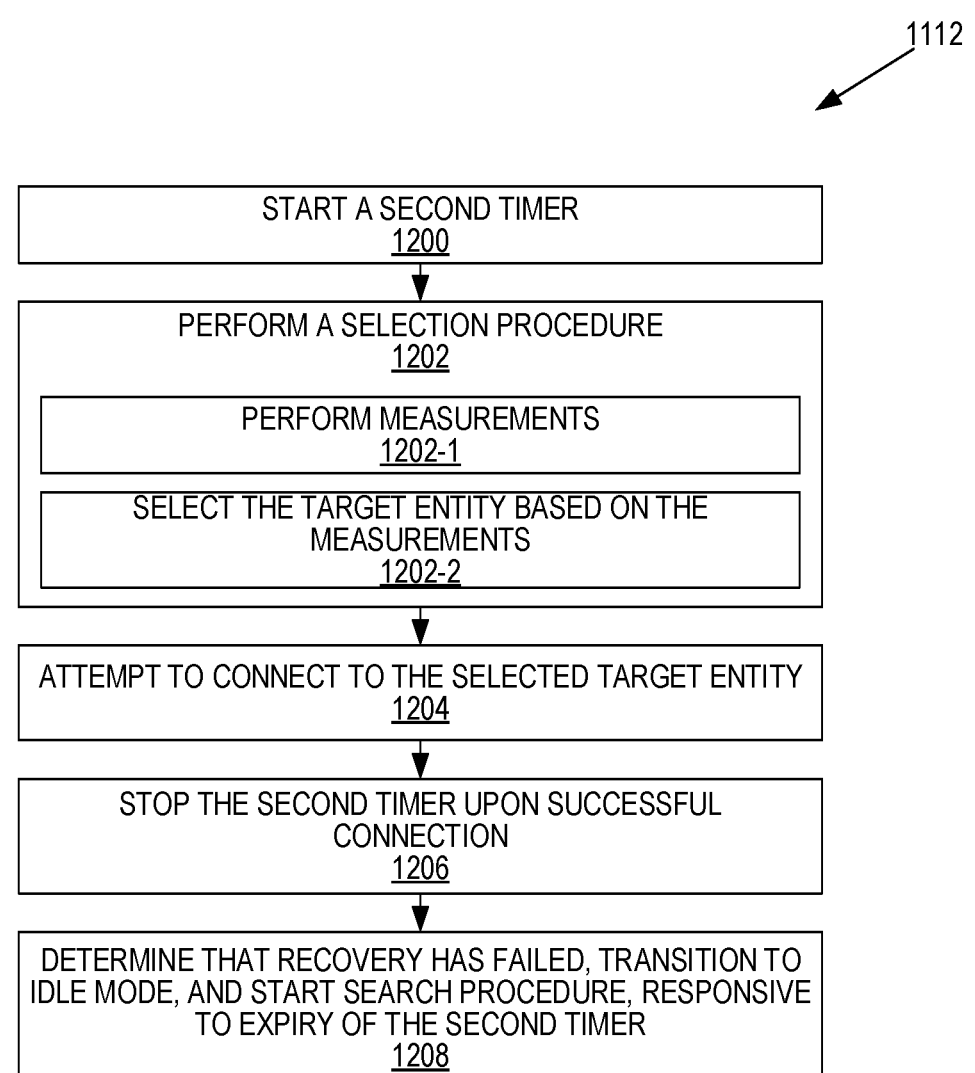
FIG. 12 is a flow chart that illustrate a path switch failure recovery procedure in accordance with an example embodiment of the present disclosure.

FIG. 12 illustrates the path switch failure recovery procedure of step 1112 in more detail, in accordance with one example embodiment of the present disclosure. As illustrated, responsive to determining that there is a path switch failure, the remote WCD 906-RM starts a second timer (step 1200). The details of the second timer and the value of the second timer described above are equally applicable here. While the second timer is running, the remote WCD 906-RM performs a selection procedure to select a target entity (e.g., a target cell or target relay WCD) for failure recovery (step 1202). Details regarding an example embodiment of this selection procedure are provided above with respect to, e.g., the fifth embodiment. For example, the selection procedure includes, in one embodiment, performing measurements on one or more potential target relay WCDs and/or on one or more potential target cells for failure recovery (step 1202-1) and then selecting a target relay WCD or a target cell for failure recovery based on the measurements (step 1202-2), e.g., in accordance with any of the variations of the fifth embodiment described above.

The remote WCD 906-RM attempts to connect to the selected target relay WCD or target cell (step 1204). The remote WCD 906-RM stops the second timer upon successful connection to the selected target relay WCD or target cell, as described above (step 1206). Responsive to expiry of the second timer, the remote WCD 906-RM determines that recovery has failed, transitions to idle mode, and starts a cell search procedure in idle mode, as described above (step 1208).

Figure 13:
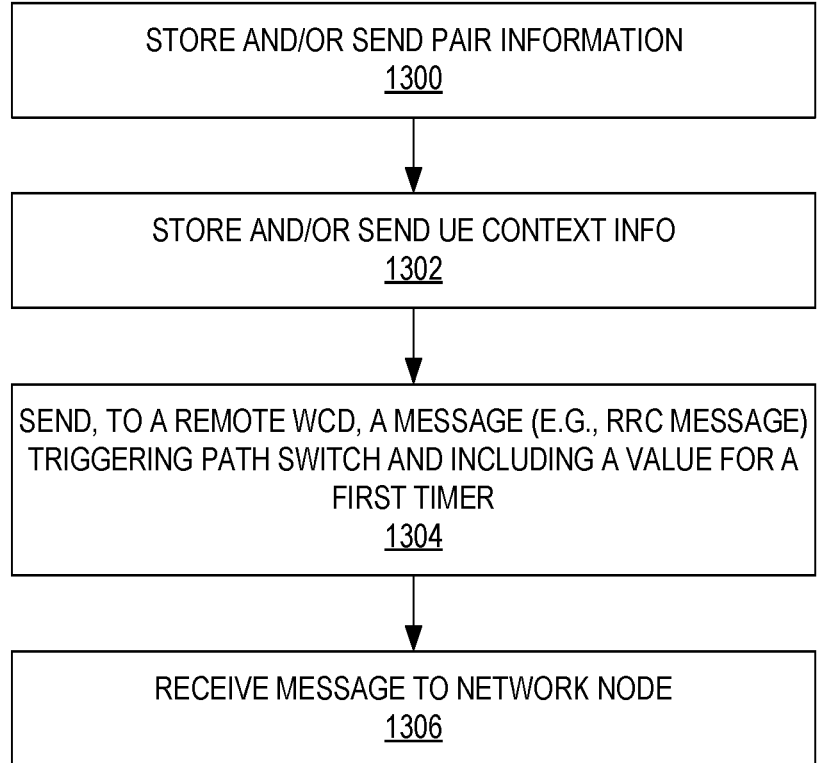
FIG. 13 is a flow chart that illustrates the operation of a network node in accordance with embodiments of the present disclosure.

FIG. 13 is a flow chart that illustrates the operation of a network node (e.g., the serving network node 902) of a remote WCD 906-RM in accordance with at least some of the embodiments described above. As illustrated, the network node stores pair information and/or sends pair information to another network node (steps 1300 and 1302), e.g., in accordance with the seventh and/or eighth embodiment described above. The network node sends, to the remote WCD 906-RM, a message that triggers, or indicates, a path switch for the remote WCD 906-RM, as described above (step 1304). As described above, the message includes a value for the first timer (step 1306). The network may receive, in some embodiments, a message from the remote WCD 906-RM related to the path switch or path switch failure recovery, as described above (step 1308). The details provided above regarding the storing/sending of UE context information, the storing/sending of pair information, the message indicating path switch, and the message received from the remote WCD 906-RM are equally applicable here.

Figure 14:
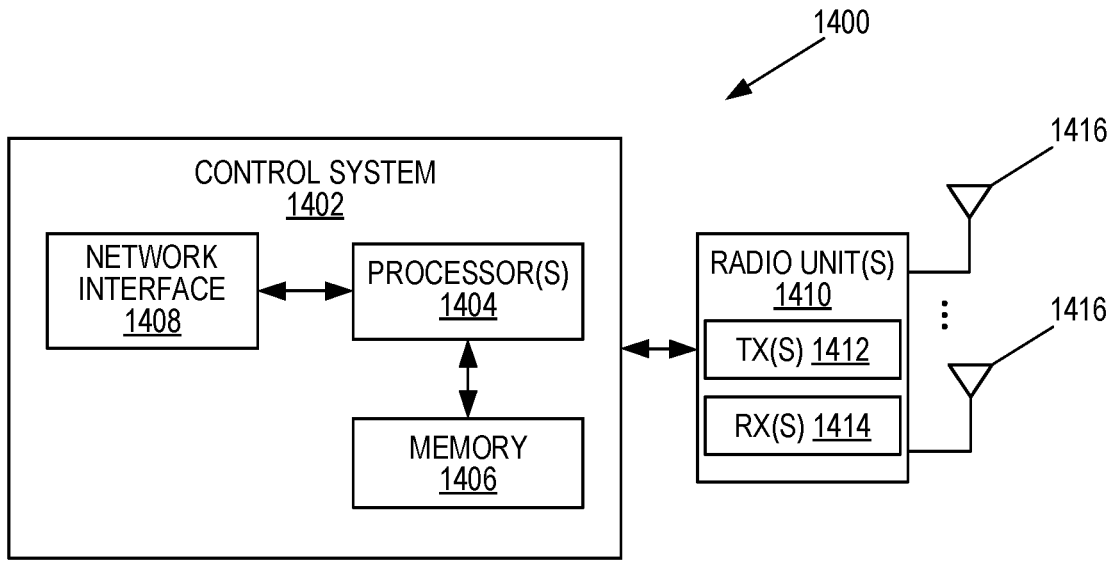
FIG. 14 is a schematic block diagram of a network node according to some embodiments of the present disclosure.
Figures 23, 24, 25:
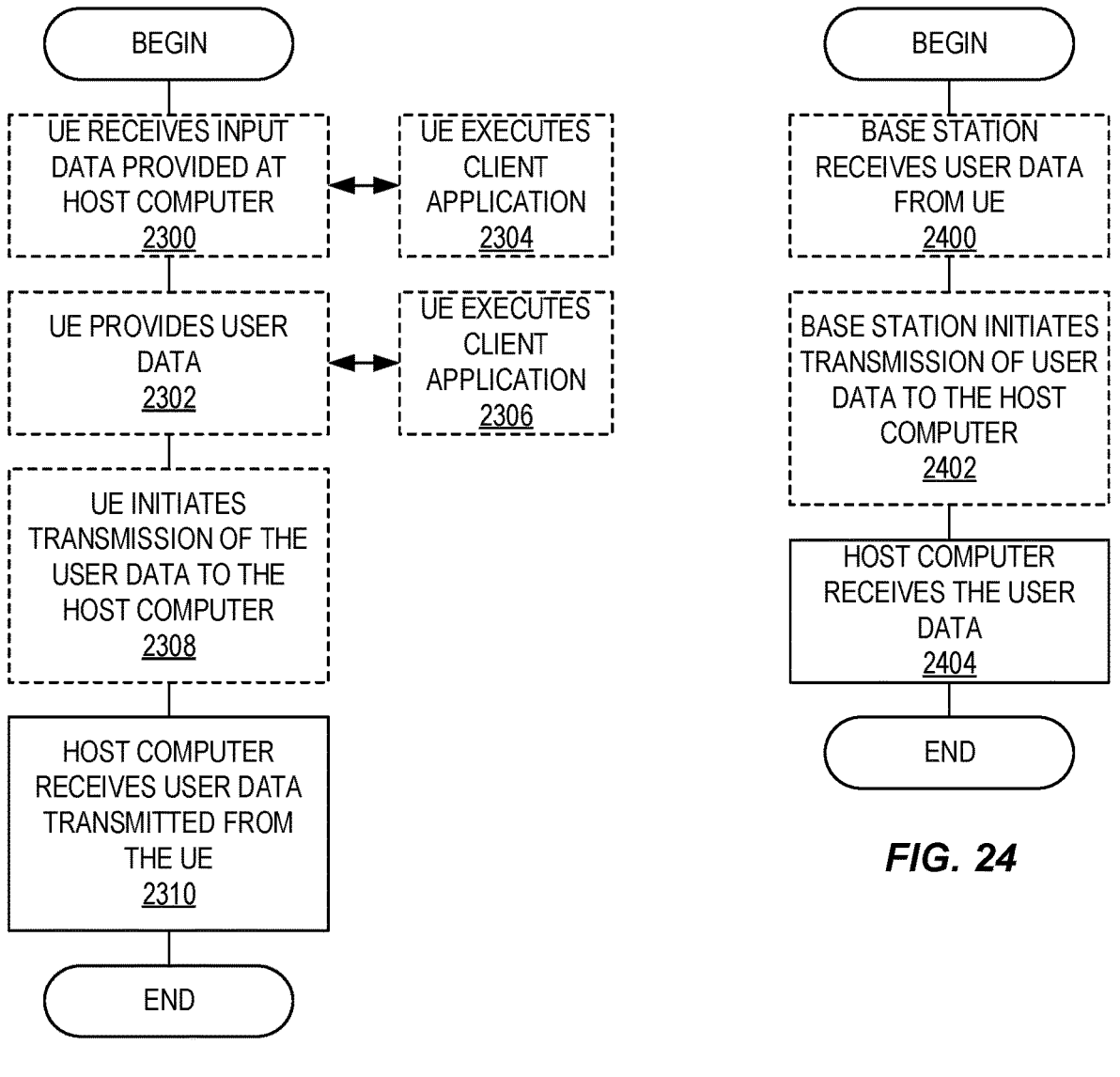
FIG. 23 is a flowchart illustrating a method implemented in a communication system in accordance with one embodiment of the present disclosure.
FIG. 24 is a flowchart illustrating a method implemented in a communication system in accordance with one embodiment of the present disclosure.
FIG. 25 is a flow chart that illustrates the operation of a relay wireless communication device in accordance with embodiments of the present disclosure.

FIG. 25 is a flow chart that illustrates the operation of a relay WCD (e.g., the relay WCD 906-RE-S) in accordance with at least some of the embodiments described above. As illustrated, in step 2500 the relay WCD transmits, to a remote WCD (e.g., the remote WCD 906-RM), cell information comprising an indication of one or more cells to which the relay WCD is connected. The indication may comprise an indication that the relay WCD is connected to a prepared cell of the remote WCD. In this way, the remote WCD is provided with information that enables it to select a relay WCD as part of a failure recovery procedure following failure of a path switch. The cell information may be signalled via one or more of: discovery signalling; RRC signalling; a MAC control element; layer 1 signalling; and one or more control PDUs of a protocol layer. FIG. 14 is a schematic block diagram of a network node 1400 according to some embodiments of the present disclosure. The network node 1400 may be, for example, a RAN node such as a base station 802 or 806 or a network node that implements all or part of the functionality of the base station 802 or gNB described herein. As illustrated, the network node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, if the network node 1400 is a RAN node, the network node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of the network node 1400 as described herein (e.g., one or more functions of a network node such as the network node 902, a serving network node, a serving gNB, a target network node, or a target gNB as described here). In some embodiments, the function(s) are implemented in software that is stored, e.g., in the memory 1406 and executed by the one or more processors 1404.

Figure 15:
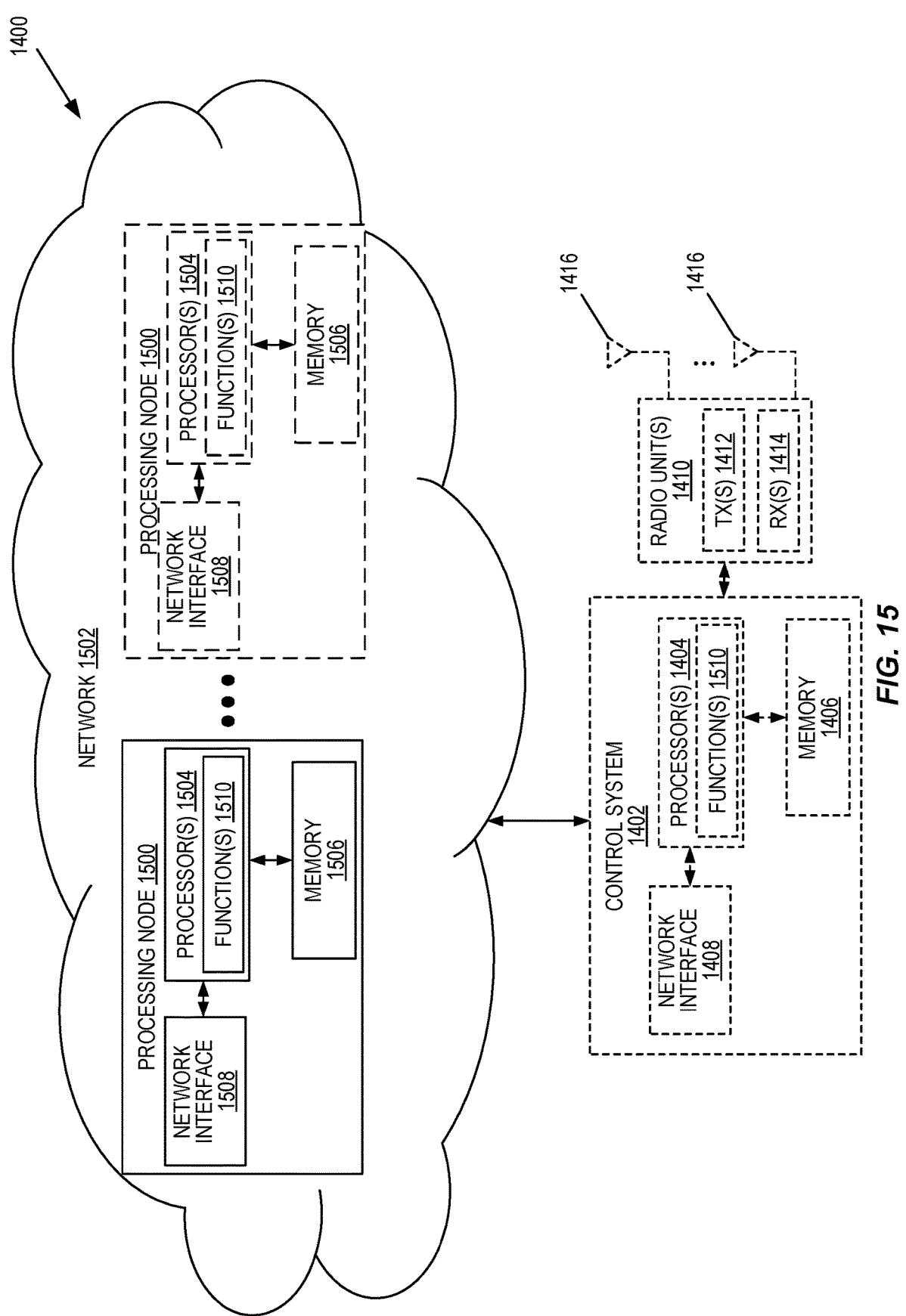
FIG. 15 is a schematic block diagram that illustrates a virtualized embodiment of the network node of FIG. 14 according to some embodiments of the present disclosure.

FIG. 15 is a schematic block diagram that illustrates a virtualized embodiment of the network node 1400 according to some embodiments of the present disclosure. As used herein, a "virtualized" network node is an implementation of the network node 1400 in which at least a portion of the functionality of the network node 1400 is implemented as a virtual component(s) (e.g., via a virtual machine(s) executing on a physical processing node(s) in a network(s)). As illustrated, the network node 1400 includes one or more processing nodes 1500 coupled to or included as part of a network(s) 1502. Each processing node 1500 includes one or more processors 1504 (e.g., CPUs, ASICs, FPGAs, and/or the like), memory 1506, and a network interface 1508. If the network node 1400 is a RAN node, the network node 1400 may include the control system 1402 and/or the one or more radio units 1410, as described above. The control system 1402 may be connected to the radio unit(s) 1410 via, for example, an optical cable or the like.

In this example, functions 1510 of the network node 1400 described herein (e.g., one or more functions of a network node such as the network node 902, a serving network node, a serving gNB, a target network node, or a target gNB as described here) are implemented at the one or more processing nodes 1500 or distributed across the one or more processing nodes 1500 and the control system 1402 and/or the radio unit(s) 1410 in any desired manner. In some particular embodiments, some or all of the functions 1510 of the network node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program or computer program product including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
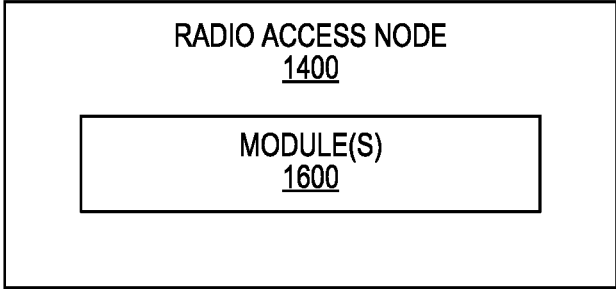
FIG. 16 is a schematic block diagram of the network node of FIG. 14 according to some other embodiments of the present disclosure.

FIG. 16 is a schematic block diagram of the network node 1400 according to some other embodiments of the present disclosure. The network node 1400 includes one or more modules 1600, each of which is implemented in software. The module(s) 1600 provide the functionality of the network node 1400 described herein (e.g., one or more functions of a network node such as the network node 902, a serving network node, a serving gNB, a target network node, or a target gNB as described here). This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
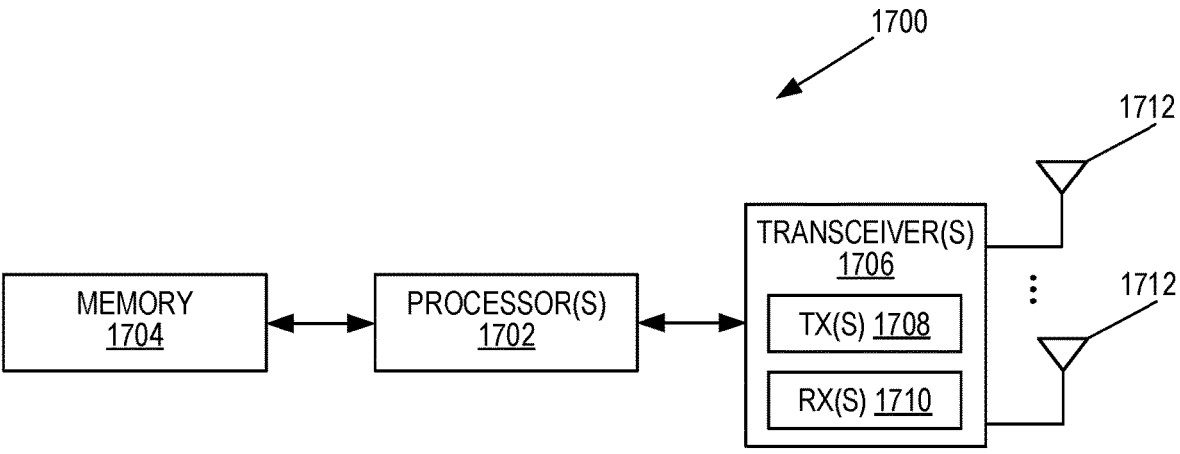
FIG. 17 is a schematic block diagram of a wireless communication device according to some embodiments of the present disclosure.

FIG. 17 is a schematic block diagram of a WCD 1700 according to some embodiments of the present disclosure. The WCD 1700 may be, for example, the remote WCD 906-RM or a relay WCD such as, for example, a target relay WCD or a source relay WCD, as described herein. As illustrated, the WCD 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the WCD 1700 described above (e.g., one or more functions of the remote WCD 906-RM or a relay WCD such as, for example, a target relay WCD or a source relay WCD, as described herein) may be fully or partially implemented in software that is, e.g., stored in the memory 1704 and executed by the processor(s) 1702. Note that the WCD 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the WCD 1700 and/or allowing output of information from the WCD 1700), a power supply (e.g., a battery and associated power circuitry), etc.

In some embodiments, a computer program or computer program product including instructions which, when executed by at least one processor, causes the at least one processor to carry out the functionality of the WCD 1700 according to any of the embodiments described herein (e.g., one or more functions of the remote WCD 906-RM or a relay WCD such as, for example, a target relay WCD or a source relay WCD, as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
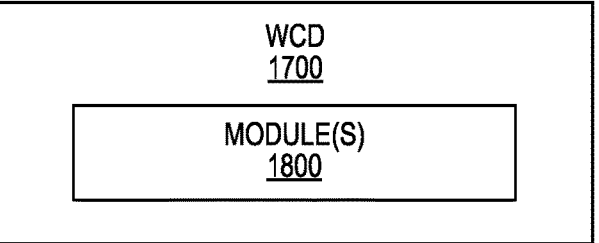
FIG. 18 is a schematic block diagram of the wireless communication device of FIG. 17 according to some other embodiments of the present disclosure.

FIG. 18 is a schematic block diagram of the WCD 1700 according to some other embodiments of the present disclosure. The WCD 1700 includes one or more modules 1800, each of which is implemented in software. The module(s) 1800 provide the functionality of the WCD 1700 described herein (e.g., one or more functions of the remote WCD 906-RM or a relay WCD such as, for example, a target relay WCD or a source relay WCD, as described herein).

Figure 19:
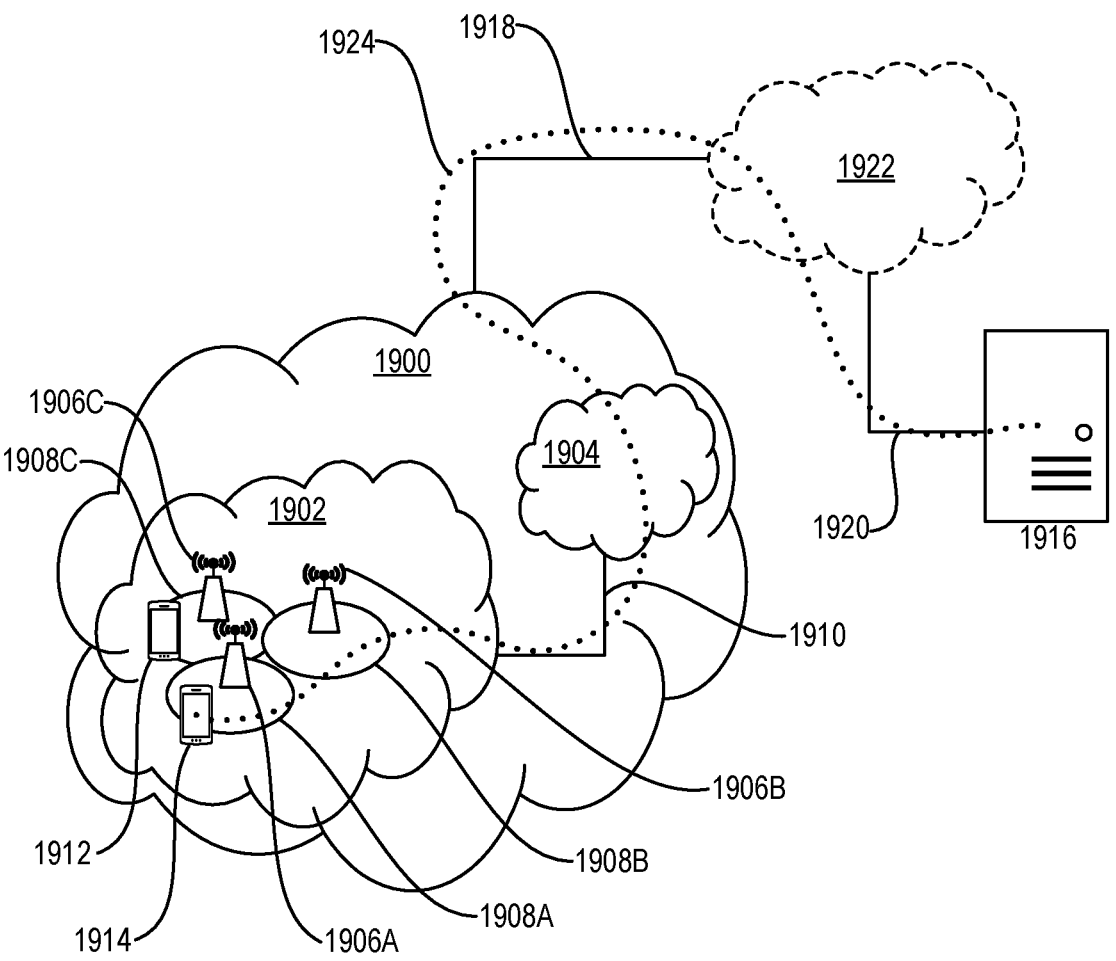
FIG. 19 illustrates a telecommunication network connected via an intermediate network to a host computer in accordance with some embodiments of the present disclosure.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
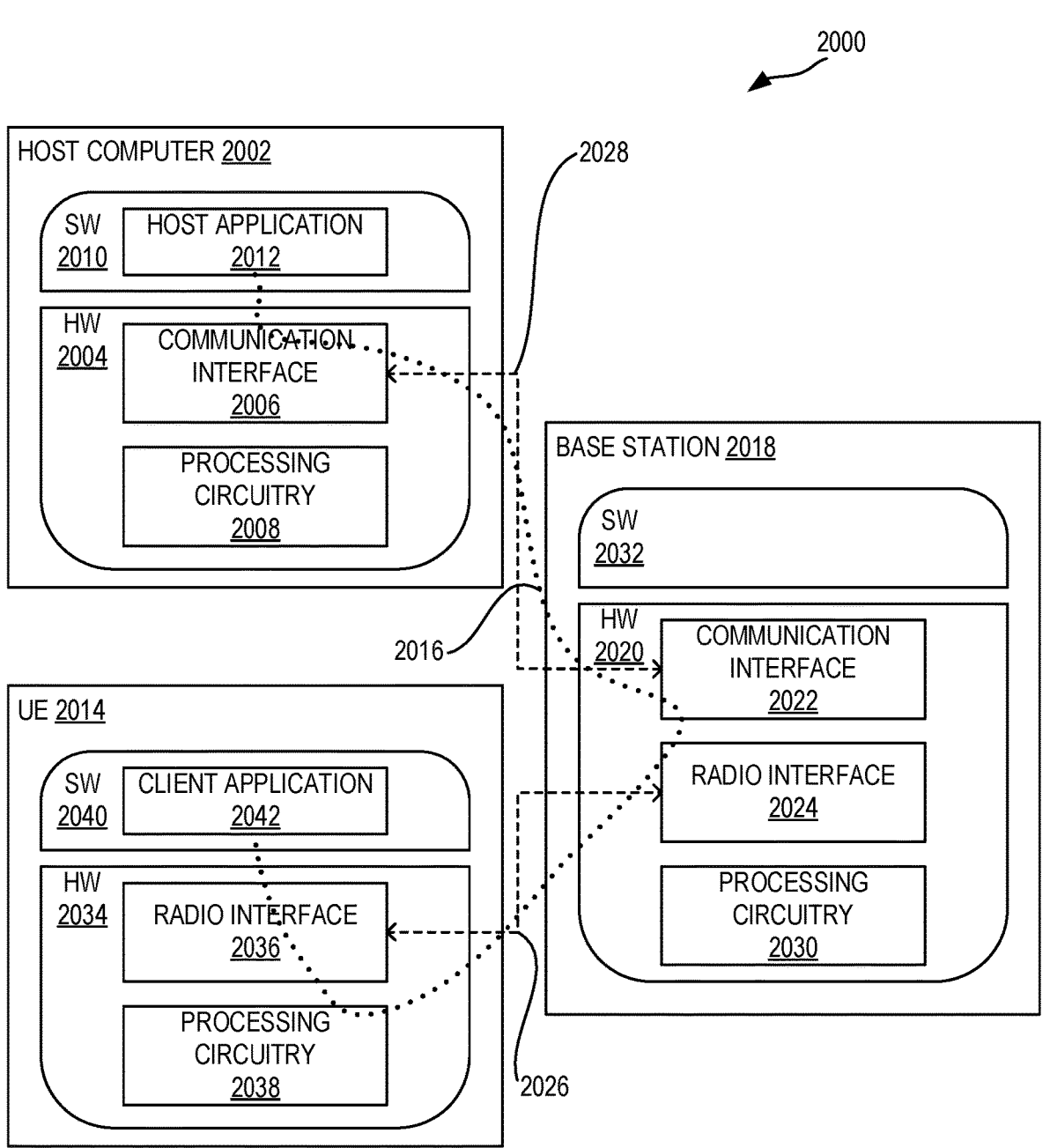
FIG. 20 is a generalized block diagram of a host computer communicating via a base station with a UE over a partially wireless connection in accordance with some embodiments of the present disclosure.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve, e.g., data rate and/or latency and thereby provide benefits such as, e.g., reduced user waiting time, relaxed restriction on file size, and/or better responsiveness.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer's 2002 measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

Figures 21, 22:
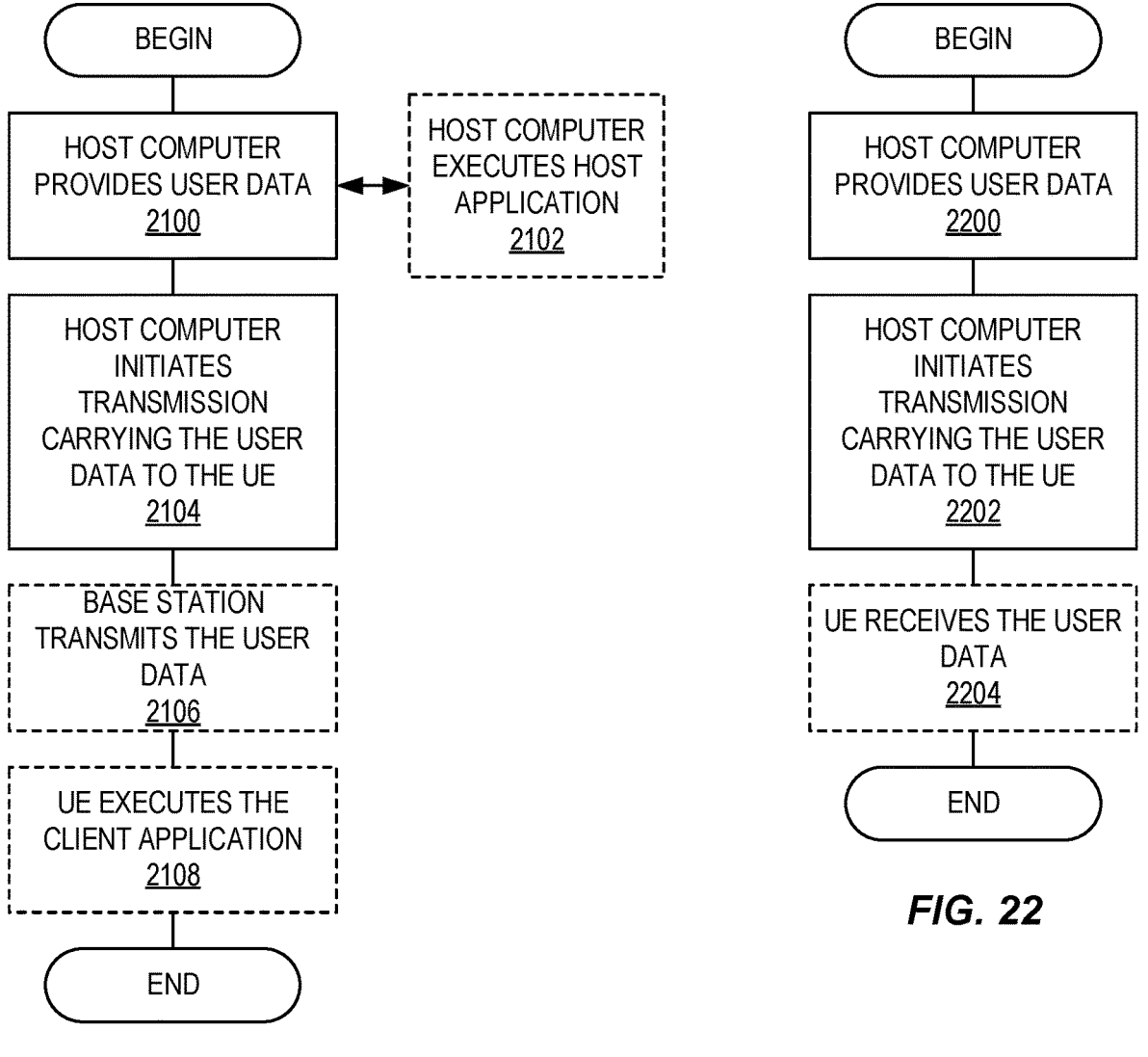
FIG. 21 is a flowchart illustrating a method implemented in a communication system in accordance with one embodiment of the present disclosure.
FIG. 22 is a flowchart illustrating a method implemented in a communication system in accordance with one embodiment of the present disclosure.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ACK Acknowledgment
AMF Access and Mobility Management Function
BWP Bandwidth Part
CE Control element
CP Cyclic Prefix
CSI-RS Channel State Information Reference Signal
DCI Downlink Control Information
DFN Direct Frame Number
DMRS Demodulation Reference Signal
gNB gNodeB
HARQ Hybrid Automatic Repeat Request
IE Information Element
LTE Long Term Evolution
MAC Media Access Control
MCS Modulation and Coding Scheme
NACK Negative Acknowledgement
NDI New Data Indicator
NR New Radio
OFDM Orthogonal Frequency-Division Multiplexing
PDCCH Physical Downlink Control Channel PDCP Packet Data Convergence Protocol
PDSCH Physical Downlink Shared Channel
ProSe Proximity-based Services
PSBCH Physical Sidelink Broadcast Channel
PSCCH Physical Sidelink Common Control Channel
PSFCH Physical Sidelink Feedback Channel
PT-RS Tracking Reference Signal
PUCCH Physical Uplink Control Channel
PUSCH Physical Uplink Shared Channel
QoS Quality of Service
RAN Radio Access Network
RB Resource Block
RLC Radio Link Control
RLF Radio Link Failure
RLM Radio Link Monitoring
RNTI Radio Network Temporary Identifier
RRC Radio Resource Control
RRC Radio Resource Control
RSRP Reference Signal Received Power
RSRQ Reference Signal Received Quality
RSSI Received Signal Strength Indicator
RV Redundancy Version
SCI Sidelink Control Information
SCS Sub-Carrier Spacing
SI System Information
SL SideLink
SMF Session Management Function
S-PSS Sidelink Primary Synchronization Signal
SSB Synchronization Signal Block
SSID Sidelink Synchronization Identity
S-SSS Sidelink Secondary Synchronization Signal
UCI Uplink Control Information
UE User Equipment
UPF User Plane Function Those skilled in the art will recognize improvements and modifications to the embodiments of the present disclosure. All such improvements and modifications are considered within the scope of the concepts disclosed herein.

For the avoidance of doubt, the following numbered statements set out embodiments of the disclosure:

1. A method performed by a remote wireless communication device (906-RM) in a communications system (900), the method comprising:
   receiving (1100), from a network node (802), a message that configures the remote wireless communication device (906-RM) to perform a path switch, wherein the message comprises a value for a first timer;
   setting (1102) the first timer to the value comprised in the message; and
   determining (1110) whether the path switch has failed based on whether the first timer expires before the path switch is successfully completed.

2. The method of embodiment 1 wherein the path switch is either:
   a) a path switch from an indirect path between the remote wireless communication device (906-RM) and a serving cell (904-S) through a serving relay wireless communication device (905-RE-S) to a direct path between the remote wireless communication device (906-RM) and a target cell (904-T) for the path switch, or
   b) a path switch from a direct path between the remote wireless communication device (906-RM) and the serving cell (904-S) to an indirect path between the remote wireless communication device (906-RM) and the target cell (904-T) for the path switch via a target relay wireless communication device (906-RE-T) for the path switch, or
   c) a path switch from a first indirect path between the remote wireless communication device (906-RM) and the serving cell (904-S) via a serving relay wireless communication device (906-S) to a second indirect path between the remote wireless communication device (906-RM) and the target cell (904-T) for the path switch via a target relay wireless communication device (906-RE-T) for the path switch.

3. The method of embodiment 1 or 2 further comprising, responsive to receiving (1100) the message:
   starting (1104) the first timer; and
   starting (1106) performance of a path switch procedure.

4. The method of any of embodiments 1 to 3 wherein the message is a Radio Resource Control, RRC, message.

5. The method of any of embodiments 1 to 4 wherein the first timer is an existing timer or a new timer.

6. The method of any of embodiments 1 to 5 wherein the path switch is a path switch from an indirect path between the remote wireless communication device (906-RM) and the serving cell (904-S) through a serving relay wireless communication device (905-RE-S) to a direct path between the remote wireless communication device (906-RM) and the target cell (904-T).

7. The method of embodiment 6 wherein the value of the first timer is a value that allows the remote wireless communication device (906-RM) to perform a defined or configured maximum number of random access attempts on the target cell (904-T).

8. The method of embodiment 7 further comprising stopping (1108) the first timer upon successful completion of random access on the target cell (904-T).

9. The method of any of embodiments 1 to 5 wherein the path switch is:
   a path switch from a direct path between the remote wireless communication device (906-RM) and the serving cell (904-S) to an indirect path between the remote wireless communication device (906-RM) and the target cell (904-T) via a target relay wireless communication device (906-RE-T), or
   a path switch from a first indirect path between the remote wireless communication device (906-RM) and the serving cell (904-S) via a serving relay wireless communication device (906-S) to a second indirect path between the remote wireless communication device (906-RM) and the target cell (904-T) via a target relay wireless communication device (906-RE-T).

10. The method of embodiment 9 wherein the value of the first timer is a value that allows the remote wireless communication device (906-RM) to complete layer 2 link establishment and/or sidelink connection setup towards the target relay wireless communication device (906-RE-T).

11. The method of any of embodiments 1 to 10 wherein the message is a RRC Reconfiguration message for conditional reconfiguration execution, the RRC Reconfiguration message comprising reconfigurationWithSync.

12. The method of any of embodiments 1 to 11 wherein:
   determining (1110) whether the path switch has failed comprises determining (1110A) that the path switch has failed responsive to expiry of the first timer before the path switch is successfully completed; and
   the method further comprises, responsive to determining (1110A) that the path switch has failed, performing (1112) a failure recovery procedure responsive to determining (1110A) that the path switch has failed.

13. The method of embodiment 12 wherein the failure recovery procedure is a RRC re-establishment procedure.

14. The method of embodiment 12 or 13 wherein performing (912) the failure recovery procedure comprises:

starting (1200) a second timer; and while the second timer is running:

performing (1202) a selection procedure to select either a target cell or a target relay wireless communication device for failure recovery; and attempting (1204) to connect to the selected target cell or the selected target relay wireless communication device for failure recovery.

15. The method of embodiment 14 wherein the second timer is an existing timer or a new timer.

16. The method of embodiment 14 or 15 wherein the second timer is set to a value that allows the remote wireless communication device (906-RM) to access the selected target cell or the selected target relay wireless communication device for failure recovery.

17. The method of any of embodiments 14 to 16 wherein performing (1202) the selection procedure comprises:

performing (1202-1) measurements on one or more potential target cells; and selecting (1202-2) the target cell for failure recovery from the one or more potential target cells based on the performed measurements.

18. The method of embodiment 17 wherein the one or more potential target cells comprise one or more previous serving cells of the remote wireless communication device (906-RM) and/or one or more neighbor cells of the serving cell (904-S) of the remote wireless communication device (906-RM).

19. The method of embodiment 17 or 18 wherein performing (1202-1) the measurements on the one or more potential target cells comprises performing (1202-1) the measurements on the one or more potential target cells based on measurement configurations received by the remote wireless communication device (906-RM) from a network node before the path switch was requested.

20. The method of any of embodiments 14 to 16 wherein performing (1202) the selection procedure comprises:

performing (1202-1) measurements on one or more potential target relay wireless communication devices; and selecting (1202-2) the target relay wireless communication device for failure recovery from the one or more potential target relay wireless communication devices based on the performed measurements.

21. The method of embodiment 20 wherein performing (1202-1) the measurements on the one or more potential target relay wireless communication devices comprises, for each potential target relay wireless communication device, performing a measurement on an existing sidelink connection between the remote wireless communication device (906-RM) and the potential target relay wireless communication device or on a discovery message received by the remote wireless communication device (906-RM) from the potential target relay wireless communication device.

22. The method of any of embodiments 14 to 16 wherein performing (1202) the selection procedure comprises:

performing (1202-1) measurements on one or more potential target cells;

performing (1202-1) measurements on one or more potential target relay wireless communication devices; and selecting (1202-2) a target cell or a target relay wireless communication device for failure recovery from the one or more potential target cells and the one or more potential target wireless communication devices based on the performed measurements.

23. The method of embodiment 22 wherein selecting (1202-2) the target cell or the target relay wireless communication device for failure recovery comprises selecting (1202-2) the target cell or the target relay wireless communication device for failure recovery based on at least one of the following conditions:

prioritize potential target cells;

prioritize potential target wireless communication devices;

select either a potential target cell or a potential target wireless communication device based on measured radio channel quality.

24. The method of embodiment 22 wherein selecting (1202-2) the target cell or the target relay wireless communication device for failure recovery comprises selecting (1202-2) the target cell or the target relay wireless communication device for failure recovery based on measured radio channel quality taking into consideration a defined or configured offset.

25. The method of any of embodiments 14 to 24 wherein the one or more potential target cells are one or more prepared cells.

26. The method of any of embodiments 14 to 25 wherein the one or more potential target relay wireless communication devices are one or more potential target relay wireless communication devices that are connected to one or more prepared cells.

27. The method of any of embodiments 14 to 26 wherein performing (1202) the selection procedure comprises performing (1202) one of two or more defined selection schemes based on an indicator received from a network node.

28. The method of any of embodiments 14 to 27 wherein performing (1112) the failure recovery procedure further comprises:

stopping (1206) the second timer upon successfully connecting to the selected target cell or the selected target relay wireless communication device for failure recovery.

29. The method of any of embodiments 14 to 28 further comprising sending (1114) a message to a network node that comprises one or more of the following:

information that indicates that the path switch failed;

information that indicates the wireless communication device (906-RM), the failed target radio node or failed target cell served by the target radio node of the path switch, and/or the failed target relay wireless communication device;

information that indicates a cause of the path switch failure;

information that indicates a pair relation between the wireless communication device (906-RM) the target radio node of the path switch;

one or more measurement results for neighbor cells or neighbor wireless communication devices (e.g., in terms of RSRP, RSRQ, RSSI, SINR, SIR, channel occupancy, or the like);

a buffer status report;

power headroom report.

30. The method of any of embodiments 14 to 28 wherein performing (1112) the failure recovery procedure further comprises:

determining (1208) that recovery has failed responsive to expiry of the second timer before a connection to the selected target cell or the selected target relay wireless communication device for failure recovery is successfully made; and responsive to determining (1208) that recovery has failed transitioning (1208) to an idle mode; and performing (1208) a search procedure.

31. A remote wireless communication device (906-RM) for a communications system (900), the remote wireless communication device (906-RM) adapted to:

receive (1100), from a network node (802), a message that configures the remote wireless communication device (906-RM) to perform a path switch, wherein the message comprises a value for a first timer;

set (1102) the first timer to the value comprised in the message;

determine (1110) whether the path switch has failed based on whether the first timer expires before the path switch is successfully completed.

32. The remote wireless communication device (906-RM) of embodiment 31 wherein the remote wireless communication device (906-RM) is further adapted to perform the method of any of embodiments 2 to 30.

33. A remote wireless communication device (906-RM) for a communications system (900), the remote wireless communication device (906-RM) comprising:

one or more transmitters (1708);

one or more receivers (1710); and processing circuitry (1702) associated with the one or more transmitters (1708) and the one or more receivers (1710), the processing circuitry (1702) configured to:

receive (1100), from a network node (802), a message that configures the remote wireless communication device (906-RM) to perform a path switch, wherein the message comprises a value for a first timer;

set (1102) the first timer to the value comprised in the message;

determine (1110) whether the path switch has failed based on whether the first timer expires before the path switch is successfully completed.

34. A computer program comprising instructions which, when executed on at least one processor, cause the at least one processor to carry out the method according to any of embodiments 1 to 30.

35. A carrier containing the computer program of embodiment 34, wherein the carrier is one of an electronic signal, an optical signal, a radio signal, or a computer readable storage medium.

36. A communication system including a host computer comprising:

processing circuitry configured to provide user data; and a communication interface configured to forward user data to a cellular network for transmission to a User Equipment (UE), wherein the UE comprises a radio interface and processing circuitry, the UE's processing circuitry configured to carry out the method according to any of embodiments 1 to 30.

37. The communication system of embodiment 36, further including the UE.

38. The communication system of embodiment 37, wherein the cellular network further includes a base station configured to communicate with the UE.

39. The communication system of embodiment 37 or 38, wherein:

the processing circuitry of the host computer is configured to execute a host application, thereby providing the user data; and the UE's processing circuitry is configured to execute a client application associated with the host application.

40. A method implemented in a communication system including a host computer, a base station and a User Equipment (UE), the method comprising:

at the host computer, providing user data; and at the host computer, initiating a transmission carrying the user data to the UE via a cellular network comprising the base station, wherein the UE carries out the method according to any of embodiments 1 to 30.

41. The method of embodiment 40, further comprising:

at the UE, receiving the user data from the base station.

42. A communication system including a host computer comprising:

a communication interface configured to receive user data originating from a transmission from a User Equipment (UE) to a base station, wherein the UE comprises a radio interface and processing circuitry, the UE's processing circuitry configured to carry out the method according to any of embodiments 1 to 30.

43. The communication system of embodiment 42, further including the UE.

44. The communication system of embodiment 43, further including the base station, wherein the base station comprises a radio interface configured to communicate with the UE and a communication interface configured to forward to the host computer the user data carried by a transmission from the UE to the base station.

45. The communication system of embodiment 43 or 44, wherein:

the processing circuitry of the host computer is configured to execute a host application; and the UE's processing circuitry is configured to execute a client application associated with the host application, thereby providing the user data.

46. The communication system of embodiment 43 or 44, wherein:

the processing circuitry of the host computer is configured to execute a host application, thereby providing request data; and the UE's processing circuitry is configured to execute a client application associated with the host application, thereby providing the user data in response to the request data.

47. A method implemented in a communication system including a host computer, a base station and a User Equipment (UE), the method comprising:

at the host computer, receiving user data transmitted to the base station from the UE, wherein the UE carries out the method according to any of embodiments 1 to 30.

48. The method of embodiment 47, further comprising:
   at the UE, providing the user data to the base station.

49. The method of embodiment 48, further comprising:
   at the UE, executing a client application, thereby providing the user data to be transmitted; and
   at the host computer, executing a host application associated with the client application.

50. The method of embodiment 48, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

51. A method performed by a network node (902) in a communications system (900), the method comprising:
   sending (1304), to a remote wireless communication device (906-RM), a message that configures the remote wireless communication device (906-RM) to perform a path switch, wherein the message comprises a value for a first timer.

52. The method of embodiment 51 wherein the path switch is either:
   a) a path switch from an indirect path between the remote wireless communication device (906-RM) and a serving cell (904-S) through a serving relay wireless communication device (905-RE-S) to a direct path between the remote wireless communication device (906-RM) and a target cell (904-T) for the path switch, or
   b) a path switch from a direct path between the remote wireless communication device (906-RM) and the serving cell (904-S) to an indirect path between the remote wireless communication device (906-RM) and the target cell (904-T) for the path switch via a target relay wireless communication device (906-RE-T) for the path switch, or
   c) a path switch from a first indirect path between the remote wireless communication device (906-RM) and the serving cell (904-S) via a serving relay wireless communication device (906-S) to a second indirect path between the remote wireless communication device (906-RM) and the target cell (904-T) for the path switch via a target relay wireless communication device (906-RE-T) for the path switch.

53. The method of embodiment 51 or 52 wherein the message is a Radio Resource Control, RRC, message.

54. The method of any of embodiments 51 to 53 wherein the first timer is an existing timer or a new timer.

55. The method of any of embodiments 51 to 54 wherein the path switch is a path switch from an indirect path between the remote wireless communication device (906-RM) and the serving cell (904-S) through a serving relay wireless communication device (905-RE-S) to a direct path between the remote wireless communication device (906-RM) and the target cell (904-T).

56. The method of embodiment 55 wherein the value of the first timer is a value that allows the remote wireless communication device (906-RM) to perform a defined or configured maximum number of random access attempts on the target cell (904-T).

57. The method of any of embodiments 51 to 54 wherein the path switch is:
   a path switch from a direct path between the remote wireless communication device (906-RM) and the serving cell (904-S) to an indirect path between the remote wireless communication device (906-RM) and the target cell (904-T) via a target relay wireless communication device (906-RE-T), or
   a path switch from a first indirect path between the remote wireless communication device (906-RM) and the serving cell (904-S) via a serving relay wireless communication device (906-S) to a second indirect path between the remote wireless communication device (906-RM) and the target cell (904-T) via a target relay wireless communication device (906-RE-T).

58. The method of embodiment 57 wherein the value of the first timer is a value that allows the remote wireless communication device (906-RM) to complete layer 2 link establishment and/or sidelink connection setup towards the target relay wireless communication device (906-RE-T).

59. The method of any of embodiments 51 to 58 wherein the message is a RRC Reconfiguration message for conditional reconfiguration execution, the RRC Reconfiguration message comprising reconfigurationWithSync.

60. The method of any of embodiments 51 to 59 further comprising receiving (1306) a message from the remote wireless communication device (906-RM) that comprises one or more of the following:
   information that indicates that the path switch failed;
   information that indicates the wireless communication device (906-RM), the failed target radio node or failed target cell served by the target radio node of the path switch, and/or the failed target relay wireless communication device;
   information that indicates a cause of the path switch failure;
   information that indicates a pair relation between the wireless communication device (906-RM) the target radio node of the path switch;
   one or more measurement results for neighbor cells or neighbor wireless communication devices (e.g., in terms of RSRP, RSRQ, RSSI, SINR, SIR, channel occupancy, or the like);
   a buffer status report;
   power headroom report.

61. The method of any of embodiments 51 to 60 further comprising storing (1300) information about a pair relationship between the remote wireless communication device (906-RM) and a selected target relay wireless communication device (906-RE-T) for the path switch.

62. The method of embodiment 61 further comprising sending (1300) the information about the pair relationship to another network node.

63. The method of embodiment 61 or 62 further comprising clearing the information about the pair relationship upon receiving a message from the remote wireless communication device (906-RM) that indicates that a new connection has been established.

64. The method of any of embodiments 51 to 62 wherein the network node (902) is a RAN node that serves the serving cell (904-S) of the remote wireless communication device (906-RM), and the method further comprises storing (1302) a UE context of the remote wireless communication device (906-RM) and/or sending (1302) the UE context of the remote wireless communication device (906-RM) to another RAN node that serves the target cell (904-T) of the path switch.

65. The method of any of embodiments 51 to 62 wherein the network node (902) is a RAN node that serves the serving cell (904-S) of the remote wireless communication device (906-RM), and a UE context of the remote wireless communication device (906-RM) is stored at the network node (902) and/or at another RAN node that serves the target cell (904-T) of the path switch, until a third timer expires.

66. The method of embodiment 64 or 65 further comprising clearing the stored UE context upon receiving a message from the remote wireless communication device (906-RM) that indicates that a new connection has been established.

67. A network node (902) for a communications system (900), the network node (902) adapted to:

send (1304), to a remote wireless communication device (906-RM), a message that configures the remote wireless communication device (906-RM) to perform a path switch, wherein the message comprises a value for a first timer.

68. The network node (902) of embodiment 67 wherein the network node (902) is further adapted to perform the method of any of embodiments 52 to 66.

69. A network node (902) for a communications system (900), the network node (902) comprising processing circuitry (1404; 1504) configured to cause the network node (902) to:

send (1304), to a remote wireless communication device (906-RM), a message that configures the remote wireless communication device (906-RM) to perform a path switch, wherein the message comprises a value for a first timer.

70. A computer program comprising instructions which, when executed on at least one processor, cause the at least one processor to carry out the method according to any of embodiments 51 to 66.

71. A carrier containing the computer program of embodiment 70, wherein the carrier is one of an electronic signal, an optical signal, a radio signal, or a computer readable storage medium.

72. A communication system including a host computer comprising:

processing circuitry configured to provide user data; and a communication interface configured to forward the user data to a cellular network for transmission to a User Equipment (UE), wherein the cellular network comprises a base station having a radio interface and processing circuitry, the base station's processing circuitry configured to carry out the method according to any of embodiments 51 to 66.

73. The communication system of embodiment 72, further including the base station.

74. The communication system of embodiment 73, further including the UE, wherein the UE is configured to communicate with the base station.

75. The communication system of embodiment 74, wherein:

the processing circuitry of the host computer is configured to execute a host application, thereby providing the user data; and the UE comprises processing circuitry configured to execute a client application associated with the host application.

76. A method implemented in a communication system including a host computer, a base station and a User Equipment (UE), the method comprising:

at the host computer, providing user data; and at the host computer, initiating a transmission carrying the user data to the UE via a cellular network comprising the base station, wherein the base carries out the method according to any of embodiments 51 to 66.

77. The method of embodiment 76, further comprising:

at the base station, transmitting the user data.

78. The method of embodiment 77, wherein the user data is provided at the host computer by executing a host application, the method further comprising:

at the UE, executing a client application associated with the host application.

79. A communication system including a host computer comprising a communication interface configured to receive user data originating from a transmission from a User Equipment (UE) to a base station, wherein the base station comprises a radio interface and processing circuitry, the base station's processing circuitry configured to carry out the method according to any of embodiments 51 to 66.

80. The communication system of embodiment 79, further including the base station.

81. The communication system of embodiment 80, further including the UE, wherein the UE is configured to communicate with the base station.

82. The communication system of embodiment 81, wherein:

the processing circuitry of the host computer is configured to execute a host application;

the UE is configured to execute a client application associated with the host application, thereby providing the user data to be received by the host computer.

The invention claimed is:

1. A method performed by a remote wireless communication device in a communications system, the method comprising:

receiving, from a network node, a message that configures the remote wireless communication device to perform a path switch;

determining whether the path switch has failed;

performing a failure recovery procedure; wherein the failure recovery procedure is performed responsive to determining that the path switch has failed and the failure recovery procedure comprises:

selecting either a suitable cell or a suitable relay wireless communication device as a target cell or a target relay wireless communication device for the failure recovery.

2. The method of claim 1, wherein the failure recovery procedure is a radio resource control (RRC) re-establishment procedure.

3. The method of claim 1, wherein the suitable cell or the suitable relay wireless communication device is a prepared cell or a prepared relay wireless communication device.

4. The method of claim 3, wherein when a prepared cell or a prepared relay wireless communication device is not available, selecting an unprepared cell, or an unprepared relay wireless communication device (WCD).

5. The method of claim 1, wherein the path switch is either:

a) a path switch from an indirect path between the remote wireless communication device and a serving cell through a serving relay wireless communication device to a direct path between the remote wireless communication device and a target cell for the path switch, or b) a path switch from a direct path between the remote wireless communication device and the serving cell to an indirect path between the remote wireless communication device and the target cell for the path switch via a target relay wireless communication device for the path switch, or c) a path switch from a first indirect path between the remote wireless communication device and the serving cell via a serving relay wireless communication device to a second indirect path between the remote wireless communication device and the target cell for the path switch via a target relay wireless communication device for the path switch.

6. The method of claim 1, wherein the failure recovery procedure comprises:
performing measurements on one or more potential target cells; and
selecting the target cell for failure recovery from the one or more potential target cells based on the performed measurements.

7. The method of claim 6, wherein performing the measurements on the one or more potential target cells comprises performing the measurements on the one or more potential target cells based on measurement configurations received by the remote wireless communication device from a network node.

8. The method of claim 1, wherein the failure recovery procedure comprises:
performing measurements on one or more potential target relay wireless communication devices; and
selecting the target relay wireless communication device for failure recovery from the one or more potential target relay wireless communication devices based on the performed measurements.

9. The method of claim 8, wherein performing the measurements on the one or more potential target relay wireless communication devices comprises, for each potential target relay wireless communication device, performing a measurement on an existing sidelink connection between the remote wireless communication device and the potential target relay wireless communication device or on a discovery message received by the remote wireless communication device from the potential target relay wireless communication device.

10. The method of claim 8, wherein the one or more potential target relay wireless communication devices are one or more potential target relay wireless communication devices that are connected to one or more previous serving cells of the remote wireless communication device.

11. The method of claim 1, wherein the failure recovery procedure comprises:
performing measurements on one or more potential target cells;
performing measurements on one or more potential target relay wireless communication devices; and
selecting a target cell or a target relay wireless communication device for failure recovery from the one or more potential target cells and the one or more potential target wireless communication devices based on the performed measurements.

12. The method of claim 11, wherein selecting the target cell or the target relay wireless communication device for failure recovery comprises selecting the target cell or the target relay wireless communication device for failure recovery based on at least one of the following conditions:
prioritize potential target cells;
prioritize potential target wireless communication devices; and/or
select either a potential target cell or a potential target wireless communication device based on measured radio channel quality.

13. The method of claim 12, wherein the one or more potential target cells comprise one or more previous serving cells of the remote wireless communication device and wherein the one or more potential target relay wireless communication devices are one or more potential target relay wireless communication devices that are connected to one or more previous serving cells of the remote wireless communication device.

14. The method of claim 1, wherein performing the failure recovery procedure further comprises starting a second timer, and wherein the step of selecting is performed while the second timer is running.

15. The method of claim 14, wherein performing the failure recovery procedure further comprises:
stopping the second timer upon successfully selecting the selected target cell or the selected target relay wireless communication device for failure recovery.

16. The method of claim 14, wherein performing the failure recovery procedure further comprises:
determining that recovery has failed responsive to expiry of the second timer before a selection to the selected target cell or the selected target relay wireless communication device for failure recovery is successfully made; and
responsive to determining that recovery has failed, transitioning to an idle mode; and
performing a search procedure.

17. The method of claim 1, further comprising sending a message to the network node that comprises one or more of the following:
information that indicates that the path switch failed;
information that indicates the wireless communication device, the failed target radio node or failed target cell served by the target radio node of the path switch, and/or the failed target relay wireless communication device;
information that indicates a cause of the path switch failure;
information that indicates a pair relation between the wireless communication device and the target radio node of the path switch;
one or more measurement results for neighbor cells or neighbor wireless communication devices;
a buffer status report; and/or
power headroom report.

18. The method of claim 1, wherein the message comprises a value for a first timer, wherein the method further comprises setting the first timer to the value comprised in the message, and wherein determining whether the path switch has failed comprises determining whether the path switch has failed based on whether the first timer expires before the path switch is successfully completed.

19. The method of claim 18, further comprising, responsive to receiving the message:
starting the first timer; and
starting performance of a path switch procedure.

20. A remote wireless communication device for a communications system, the remote wireless communication device adapted to:

receive, from a network node, a message that configures the remote wireless communication device to perform a path switch;

determine whether the path switch has failed;

perform a failure recovery procedure; wherein the failure recovery procedure is performed responsive to determining that the path switch has failed and the failure recovery procedure comprises:

select either a suitable cell or a suitable relay wireless communication device as a target cell or a target relay wireless communication device for the failure recovery.

* * * * *